(12) United States Patent
Lin

(10) Patent No.: US 6,424,914 B1
(45) Date of Patent: *Jul. 23, 2002

(54) FULLY-COUPLED VEHICLE POSITIONING METHOD AND SYSTEM THEREOF

(75) Inventor: Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/751,549

(22) Filed: Dec. 26, 2000

(51) Int. Cl.$^7$ .............................................. G01C 21/26
(52) U.S. Cl. ...................... 701/214; 701/207; 701/213; 342/357.01; 342/450; 342/451
(58) Field of Search ................................ 701/213, 214, 701/215, 220, 207; 342/357.01, 357.02, 357.05, 357.06, 357.12, 450, 451

(56) References Cited

U.S. PATENT DOCUMENTS 5,555,503 A * 9/1996 Kyrtsos et al. ............. 701/213
6,157,891 A * 12/2000 Lin ............................ 701/301
6,212,476 B1 * 4/2001 Noy et al. ..................... 702/9
6,278,945 B1 * 8/2001 Lin ............................ 701/216
6,292,750 B1 * 9/2001 Lin ............................ 701/214

* cited by examiner

*Primary Examiner*—Gertrude Arthur
(74) *Attorney, Agent, or Firm*—Raymond Y. Chan; David and Raymond Patent Group

(57) ABSTRACT

A fully-coupled vehicle positioning method and system with differential GPS substantially solves problems encountered in either the global positioning system-only or the inertial novigation system-only, such as loss of global positioning satellite signal, sensitivity to jamming and spoofing, and an inertial solution's drift over time, in which the velocity and acceleration from an inertial navigation processor of the integrated GPS/INS system are used to aid the code and carrier phase tracking of the global positioning system satellite signals, so as to enhance the performance of the global positioning and inertial integration system, even in heavy jamming and high dynamic environments. To improve the accuracy of the integrated GPS/INS navigation system, phase measurements are used and the idea of the differential GPS is employed. A master-slave relative positioning scheme is invented and is effective for high accuracy formation driving and flight.

3 Claims, 12 Drawing Sheets

FULLY-COUPLED VEHICLE POSITIONING METHOD AND SYSTEM THEREOF

CROSS REFERENCE OF RELATED APPLICATION

This is a non-provisional application of a U.S. Pat. No. 6,167,347, issued Dec. 26, 2000, and another non-provisional application, application Ser. No. 09/661,587, filed on Sep. 14, 2000.

FIELD OF THE PRESENT INVENTION

The present invention relates generally to a global positioning system and inertial measurement unit (GPS/IMU) integrated positioning and navigation method and system, and more particularly to an improved fully-coupled integration method and system of the global positioning system (GPS) receiver and the inertial measurement unit (IMU), which allows the mutual aiding operation of the GPS receiver and the inertial navigation system (INS) at an advanced level with features of inertial aiding global positioning system satellite signal tracking, fuzzy logic for attitude determination, master-slave relative positioning, robust attitude determination, and on-the-fly resolution of GPS carrier phase integer ambiguities and real-time positioning in the differential GPS mode.

BACKGROUND OF THE PRESENT INVENTION

The GPS user equipment, which comprises an antenna, a signal processing unit, and associated electronics and displays, receives the signals from the GPS satellites to obtain position, velocity, and time solutions. There are two types of GPS observables: code pseudoranges and carrier phases. Phase measurements are based on two L-band carrier frequencies. One is the L1 carrier with frequency 1575.42 MHz and the other is the L2 carrier with frequency 1227.60 MHz. For pseudorange measurements, there are two basic types of Pseudo Random Noise (PRN) code measurements. One is known as the C/A (Coarse/Acquisition) code modulated on the L1 frequency only and the other is known as the P (Precise) code modulated on both L1 and L2 frequencies. In addition to the above information in the GPS signals, the GPS signals also modulate the navigation message, which includes GPS time, clock corrections, broadcast ephemerides, and system status, on both L1 and L2 frequencies.

Because of the navigation message transmitted by the GPS satellites, the positions and velocities of the GPS satellites can be computed. Therefore, the propagating time of a GPS signal can be determined. Since the signal travels at the speed of light, the user can calculate the geometrical range to the satellite. In this way, the code pseudorange measurements can be determined and is degraded by errors, such as ephemeris errors, user and satellite clock biases (including selective availability (SA)), atmospheric effects (ionosphere and troposphere), and measurement noise (receiver error and random noise). These errors not only affect pseudorange measurements but phase measurements. The most obvious difference between both measurements is the measurement error. For phase measurements, the measurement noise is of the order of a few millimeters and for pseudorange measurements, the measurement noise is accurate to about 30 centimeters (for the P code) or 3 meters (for the C/A code).

The Global Positioning System, GPS, contains a number of error sources: the signal propagation errors, satellites errors, and the selective availability. The user range error (URE) is the resultant ranging error along the line-of-sight between the user and the global positioning system satellite. Global positioning system errors tend to be relatively constant (on average) over time, thus giving the global positioning system long-term error stability. However, the signals of the global positioning system may be intentionally or unintentionally jammed or spoofed, or the global positioning system (GPS) receiver antenna may be obscured during vehicle attitude maneuvering, and the global positioning system signals may be lost when the signal-to-noise ratio is low and the vehicle is undergoing highly dynamic maneuvers.

In addition to the unavoidable errors (such as ionospheric delay, tropospheric delay, clock biases, and measurement errors) and the intentional error (such as SA), the GPS measurements (pseudorange and phase) may also be affected by the environment surrounding a GPS user antenna. Like the multipath effect, because of an object nearby the user antenna, the antenna receives not only a direct signal from a GPS satellite but also a second or more reflected or diffracted signals from the object. For a highly dynamic vehicle, the onboard GPS receiver may lose the lock of a GPS signal because the signal-to-noise ratio (SNR) is low or the GPS signal is blocked by the body of its own vehicle.

Typically, the navigation solution is estimated by using the pseudorange measurements. Since the satellite clock biases are provided by the navigation message, for three-dimensional position determination, in addition to the three unknowns in position, the receiver (user) clock bias also needs to be estimated, i.e., there are four unknowns for the navigation solution. As a result, for a stand-alone receiver, the position determination usually needs a minimum of four visible GPS satellites, and the estimated position is accurate to about 100 meters with SA on. In order to improve the accuracy of the estimated position, the phase measurements will be used. Also, to eliminate the most of SA and other common errors (for example, receiver and satellite clock biases), the differential GPS will be employed. As a result, the accuracy of the estimated position is of the order of a few centimeters. However, to achieve the centimeter accuracy, one of the key steps is to resolve carrier phase integer ambiguities.

An inertial navigation system (INS) comprises an onboard inertial measurement unit (LIU), a processor, and embedded navigation software(s), where the components of the IMU include the inertial sensors (accelerometers and gyros) and the associated hardware and electronics. Based on measurements of vehicle specific forces and rotation rates obtained from onboard inertial sensors, the positioning solution is obtained by numerically solving Newton's equations of motion.

The inertial navigation system is, in general, classified as a gimbaled configuration and a strapdown configuration. For a gimbaled inertial navigation system, the accelerometers and gyros are mounted on a gimbaled platform to isolate the sensors from the rotations of the vehicle and then to keep the measurements and navigation calculations in a stabilized navigation coordinate frame. Generally, the motion of the vehicle can be expressed in several navigation frames of reference, such as earth centered inertial (ECI), earth-centered earth-fixed (ECEF), locally level with axes in the directions of north-east-down (NED), and locally level with a wander azimuth. For a strapdown inertial navigation system, the inertial sensors are rigidly mounted to the vehicle body frame. In order to perform the navigation computation in the stabilized navigation frame, a coordinate frame transformation matrix is used to transform the acceleration and rotation measurements from the body frame to one of the navigation frames.

In general, the measurements from the gimbaled inertial navigation system are more accurate than the ones from the strapdown inertial navigation system. And, the gimbaled inertial navigation system is easier in calibration than the strapdown inertial navigation system. However, the strapdown inertial navigation systems are more suitable for higher dynamic conditions (such as high turn rate maneuvers) which can stress inertial sensor performance. Also, with the availability of modem gyros and accelerometers, the strapdown inertial navigation systems become the predominant mechanization due to their low cost and reliability.

Inertial navigation systems, in principle, permit pure autonomous operation and output continuous position, velocity, and attitude data of the vehicle after initializing the starting position and initiating an alignment procedure. In addition to autonomous operation, other advantages of an inertial navigation system include the full navigation solution and wide bandwidth. However, an inertial navigation system is expensive and is degraded with drift in output (position and velocity) over an extended period of time. It means that the position and velocity errors increase with time. This error propagation characteristic is primarily caused by, such as, gyro drift, accelerometer bias, misalignment, gravity disturbance, initial position and velocity errors, and scale factor errors.

Under the requirements, such as low cost, high accuracy, continuous output, high degree of resistance to jamming, and high dynamics, the stand-alone INS and stand-alone GPS have difficulties to perform properly. Therefore, to decrease or diminish the drawbacks for each system (INS and GPS), the integration of both systems is one of the ways to achieve the above requirements. In general, there are three conventional approaches for integrating the GPS and INS. The first approach is to reset directly the INS with the GPS-derived position and velocity. The second approach is the cascaded integration where the GPS-derived position and velocity are used as the measurements in an integration Kalman filter. The third approach is to use an extended Kalman filter which processes the GPS raw pseudorange and delta range measurements to provide optimal error estimates of navigation parameters, such as the inertial navigation system, inertial sensor errors, and the global positioning system receiver clock offset.

However, there are some shortcomings of the above existing integration approaches and they are summarized as follows:

1. In the conventional global positioning system and inertial navigation system integration approaches, only position and velocity from the output of the GPS receiver or the GPS raw pseudorange and delta range measurements are used. However, the GPS raw phase measurements haven't been used for an integration solution, although the phase measurements are accurate to a few millimeters in contrast to 30 centimeters for the P code pseudorange or 3 meters for the C/A code pseudorange in the presence of measurement noise.
2. There is a significant impediment to the aiding of the global positioning system signal tracking loops with an inertial navigation system. It is that the aiding causes the potential instability of the conventional global positioning system and inertial navigation integration system because of a positive feedback signal loop in the integrated global positioning and inertial system. As a result, the degradation in accuracy of the inertial aiding data increases the signal tracking errors. And, the increased tracking errors are fed back into the inertial system. This may cause further degradation of the inertial system because the measurements may severely affect the Kalman filter, which is well tuned for a low accuracy inertial navigation system.
3. The inertial sensors in the conventional tightly-coupled GPS and inertial integration system can not provide the high accuracy in velocity. Therefore, the aiding of a carrier phase tracking loop can not execute properly due to the need for high accuracy of the external input velocity.

SUMMARY OF THE PRESENT INVENTION

An objective of the present invention is to use the velocity and acceleration from an inertial navigation processor, which are corrected by a Kalman filter, as the aiding of the code and carrier phase tracking of the GPS satellite signals so as to enhance the performance of the GPS/INS, even in heavy jamming and high dynamic environments, and to improve the accuracy of the receiver position and velocity by using differential GPS. To accurately determine the receiver position and velocity at the centimeter level, the GPS phase measurements will be used and the differential GPS will be employed. In this invention, a new process (OTF (on-the-fly) technique) is disclosed to resolve the integer ambiguities on the fly and estimate the receiver position in real time. The results of GPS estimates will increase the accuracy of the inertial navigation system and therefore enhance the capability of the GPS tracking loop.

Another objective of the present invention is that the self-contained INS complements the GPS as the GPS receiver loses lock of the GPS signals. Once the GPS receiver regains the signals and then estimates the receiver position and velocity, the output (position and velocity) of the GPS receiver is used to correct the position and velocity of the INS that have drifted.

Another objective of the present invention is that a data link is used to receive the data, such as position, velocity, and raw measurements, from a reference site in addition to a GPS receiver to collect the raw measurements for a rover site. Using the differential GPS and phase measurements, the accuracy of the GPS positioning is of the order of centimeter level after fixing the integer ambiguities, and, as a result, the integrated GPS/INS is applicable in high accuracy positioning.

Another objective is to use fizzy logic for multi-antenna GPS attitude determination, where false GPS measurements are isolated to enhance the robustness of the attitude determination system.

Another objective is to use a master-slave scheme for relative positioning using GPS which is difficult to intercept indirectly.

A further objective of the present invention is that the inertial navigation system can aid the resolution of the GPS carrier phase integer ambiguities by providing more accurate position information.

Another objective of the present invention is that the Kalman filter processes the GPS phase measurements as well as the GPS pseudorange and delta range from both reference and rover sites, so as to improve the accuracy of the integrated positioning solution.

Another objective of the present invention is that the Kalman filter is implemented in real time to optimally blend the GPS raw data and the INS solution and to estimate the navigation solution.

Another further objective of the present invention is that a robust Kalman filter is implemented in real time to eliminate the possible instability of the integration solution.

Another objective of the present invention is that a low accuracy inertial sensor is used to achieve a high accuracy integration solution by the aid of the global positioning system measurement.

Another objective of the present invention is to provide a real-time integrated vehicle positioning method, which can substantially solve the problem of instability present in many existing systems where a Kalman filter is used to perform optimal estimation.

Another objective of the present invention is to provide a real-time integrated vehicle positioning method, which supports high precision navigation in general aviation and space applications. It can also be used for ground motion vehicles tracking and navigation applications.

Another objective of the present invention is to provide a real-time integrated vehicle positioning method, which uses the GPS raw phase measurements to update the inertial navigation system and aids the GPS tracking loop by the accurate output of the inertial navigation system so as to satisfy the requirements of, such as, low cost, high accuracy, continuous output, high degree of resistance to jamming, and high dynamics, and to overcome the disadvantages of the existing techniques.

DETAILED DESCRIPTION OF THE PRESENT EMBODIMENT

Figure 1:
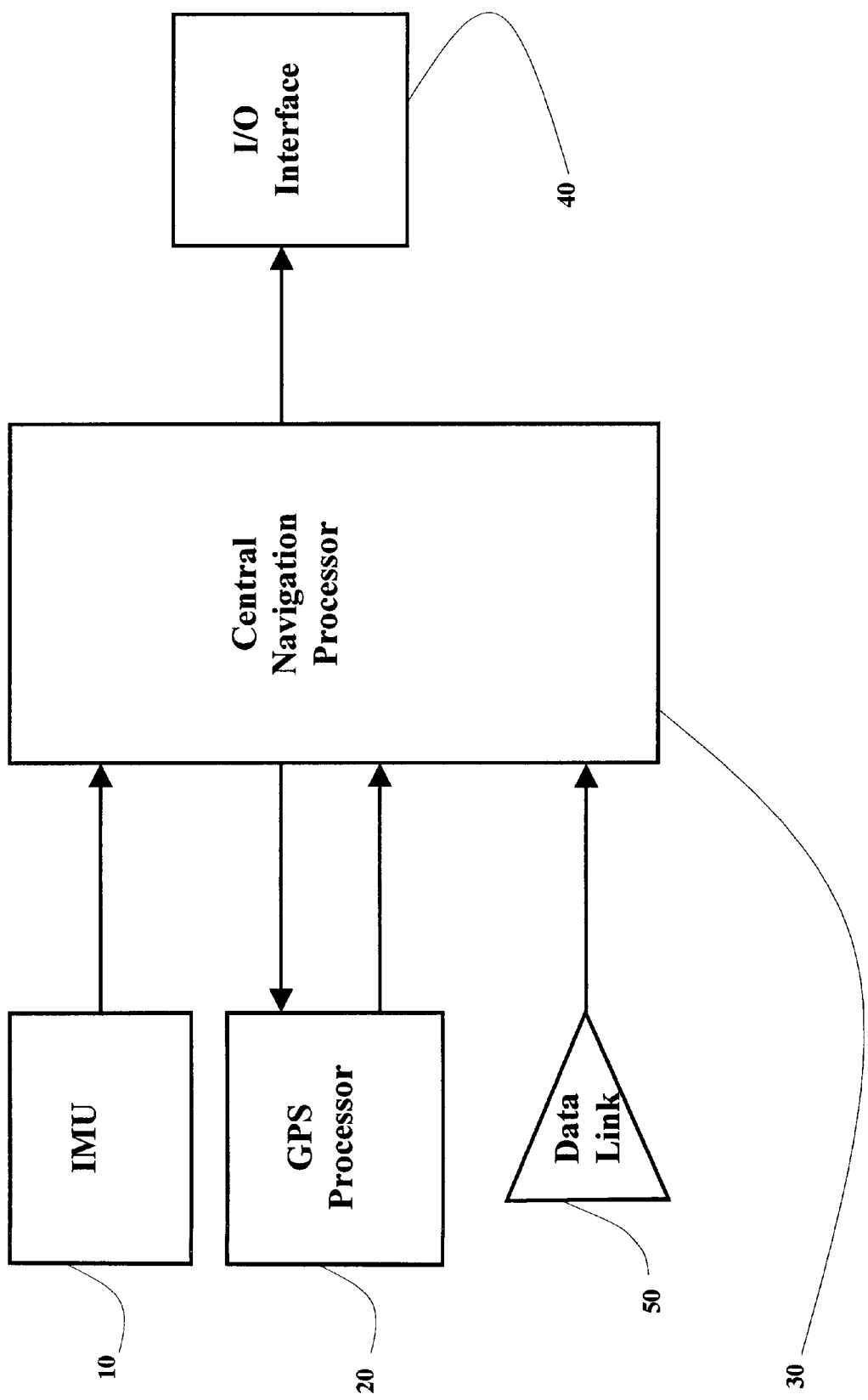
FIG. 1 is a block diagram illustrating an improved fully-coupled vehicle positioning method and system with differential GPS according to a preferred embodiment of the present invention, in which the global positioning system measurement and the inertial measurement are blended in a central navigation processor.

The improved fully-coupled GPS/IMU vehicle positioning system with differential GPS of the present invention, as shown in FIG. 1, comprises an IMU (inertial measurement unit) 10 and a GPS (global positioning system) processor 20 which are connected to a central navigation processor 30. The navigation solution is output to an I/O (input/output) interface 40. To perform differential GPS, a data link 50, which is also connected to the central navigation processor 30, is used to receive the position, velocity, and raw measurements (pseudorange and phase) from the reference site. The central navigation processor 30 is responsible for all data processing tasks.

Figure 2:
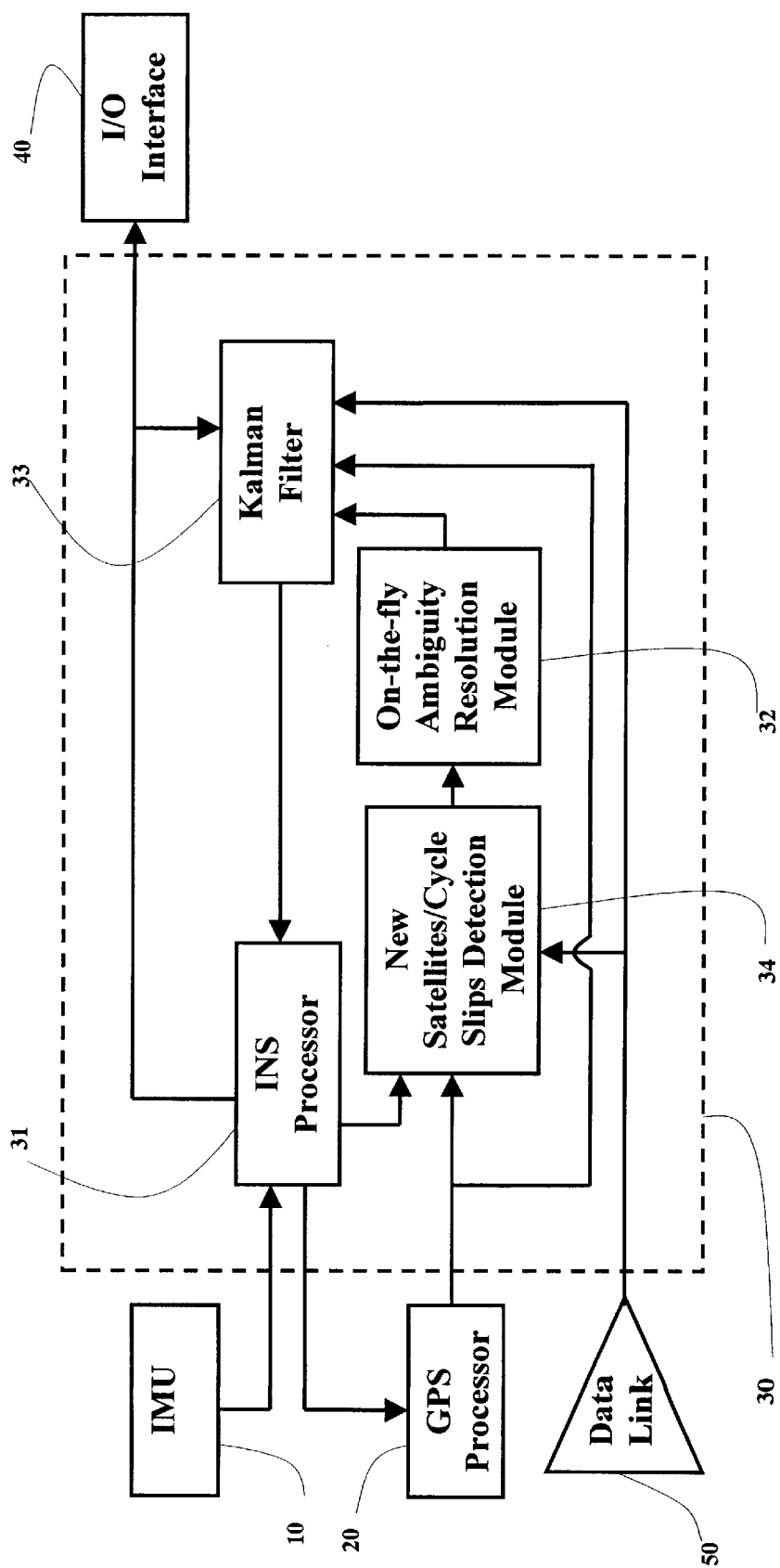
FIG. 2 is a block diagram of the central integrated navigation processing, including the global positioning system and inertial sensors, according to the above preferred embodiment of the present invention.

Referring to FIG. 1 and FIG. 2, the improved fully-coupled global positioning system/inertial measurement unit (GPS/IMU) vehicle positioning process with differential GPS of the present invention comprises the following steps.

a) Receive GPS rover measurements (including pseudorange, carrier phase, and Doppler shift) from the GPS processor 20 and GPS reference measurements, position, and velocity from the data link 50, and then pass them to the central navigation processor 30. Receive inertial measurements (including body angular rates and specific forces) from the IMU 10 and then inject them into an INS processor 31 (as shown in FIG. 2) of the central navigation processor 30.

b) Combine the output of the INS (inertial navigation system) processor 31 and the GPS measurements in a Kalman filter 33 (as shown in FIG. 2).

c) Feed back the output of the Kalman filter 33 to the INS processor 31 to correct an INS navigation solution.

d) Inject the corrected velocity and acceleration data from the INS processor 31 into the GPS processor 20 to aid the code and carrier phase tracking of the global positioning system satellite signals.

e) Inject the outputs of the GPS processor 20, the data link 50, and the INS processor 31 into a new satellites/cycle slips detection module 34 to test the occurrence of new satellites and cycle slips. When the new satellites/cycle slips detection module 34 is on, an on-the-fly ambiguity resolution module 32 is activated.

f) Output carrier phase integer ambiguities as the ambiguities are fixed from the on-the-fly ambiguity resolution module 32 into the Kalman filter 33 to use the GPS carrier phase measurement to update the Kalman filter to further improve the positioning accuracy.

g) Output navigation data from the INS processor 31 to the I/O interface 40. The output of the I/O interface 40 can be connected to other on-board avionics systems.

Figure 9:
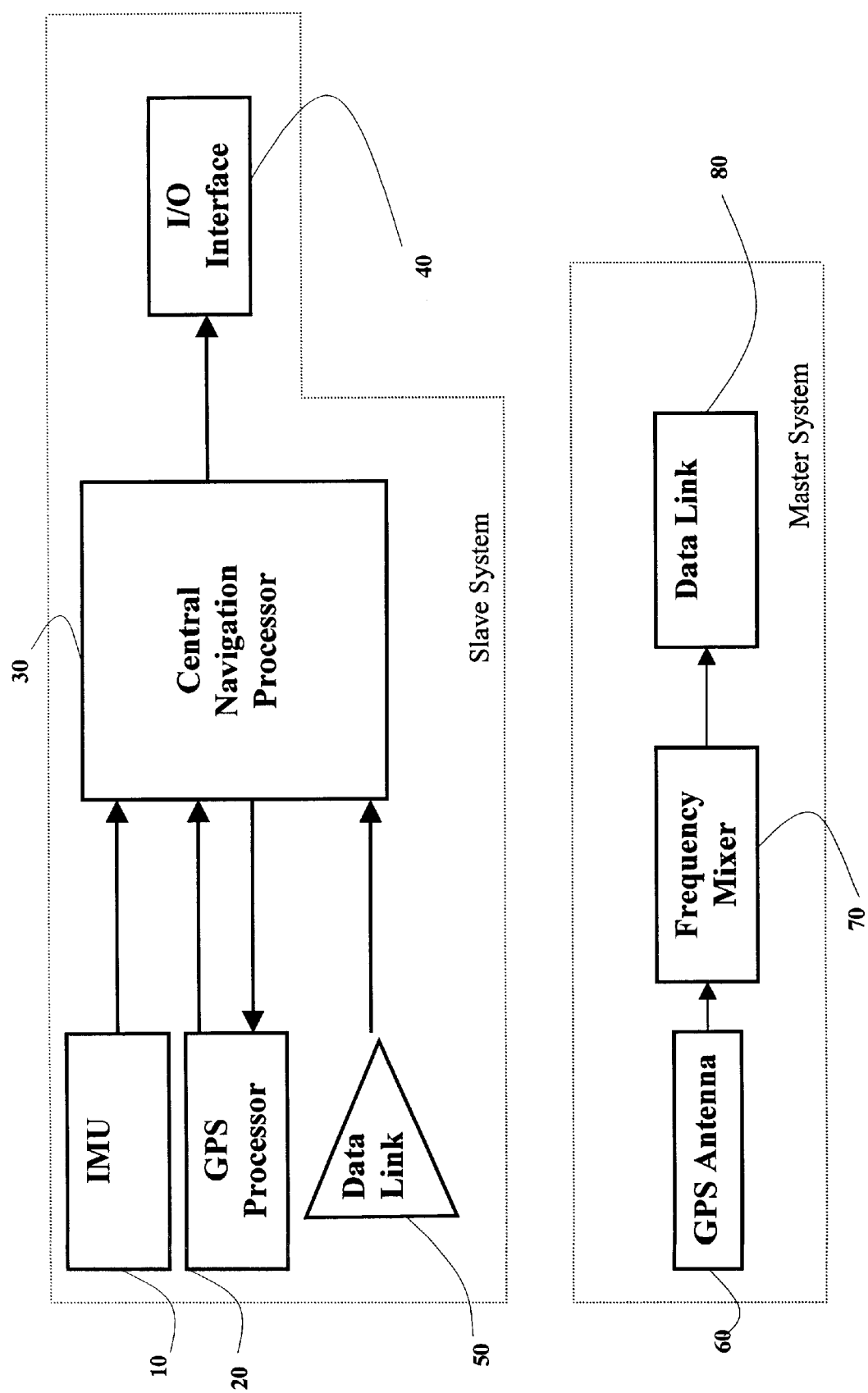
FIG. 9 is a block diagram of the master-slave relative positioning process according to the above preferred embodiment of the present invention.

The master-slave positioning system comprises of a master system and a slave system, as shown in FIG. 9. The master system comprises a GPS antenna 60, a frequency mixer 70, and a data link 80, where the data link 80 is used for retransmitting received GPS signal from the GPS antenna 60. The slave system comprises of an IMB (inertial measurement unit) 10 and a GPS (global positioning system) processor 20 which are connected to a central navigation processor 30, a data link 50 for receiving GPS signal retransmitted from the master system, and an I/O (input/output) interface 40. The central navigation processor 30 is responsible for all data processing tasks.

The master-slave relative positioning process comprises steps of:

(a) Receive GPS signals by a GPS antenna 60 of a master system, and send the received GPS signals to a frequency mixer 70.

(b) Shift the carrier frequency of the received GPS signals by the frequency mixer 70.

(c) Broadcast the carrier frequency shifted GPS signals by a data link 80 of the master system.

(d) Receive GPS measurements (including pseudorange, carrier phase, and Doppler shift) from the GPS processor 20 of the slave system and GPS signals retransmitted from master system from the data link 50, and then pass them to the central navigation processor 30. Receive inertial measurements (including body angular rates and specific forces) from the IMU 10 and then inject them into an INS processor 31 (as shown in FIG. 2) of the central navigation processor 30.

(e) Combine the output of the INS (inertial navigation system) processor 31 and the GPS measurements in a Kalman filter 33 (as shown in FIG. 2).

(f) Feed back the output of the Kalman filter 33 to the INS processor 31 to correct an INS navigation solution.

(g) Inject the corrected velocity and acceleration data from the INS processor 31 into the GPS processor 20 to aid the code and carrier phase tracking of the global positioning system satellite signals.

(h) Inject the outputs of the GPS processor 20, the data link 50, and the INS processor 31 into a new satellites/cycle slips detection module 34 to test the occurrence of new satellites and cycle slips. When the new satellites/cycle slips detection module 34 is on, an on-the-fly ambiguity resolution module 32 is activated.

(i) Output carrier phase integer ambiguities as the ambiguities are fixed from the on-the-fly ambiguity resolution module 32 into the Kalman filter 33 to use the GPS carrier phase measurement to update the Kalman filter to further improve the positioning accuracy.

(j) Output navigation data from the INS processor 31 to the I/O interface 40. The output of the I/O interface 40 can be connected to other on-board avionics systems.

The master-slave navigation configuration performs autonomous navigation processing on a slave carrier, and determines the precise relative position with respect to a second one (master). These navigation functions are validated by executing kinematic differential GPS processing based on the observables extracted from the direct GPS signals and the GPS-like signals transmitted by a data link on the master carrier.

A GPS antenna of the master system receives all the visible GPS satellite signals. These signals are transmitted through a data link after a carrier frequency shift procedure. All features of the GPS signal are maintained on the transmitting GPS-like signal, such as the C/A code modulation, P code modulation, navigation message modulation, etc. On the slave system, a corresponding data link is used to receive the GPS-like signals from the master spacecraft. Then an inverse carrier frequency shift is made on the slave carrier to retrieve the signal transmitted by the master system. The retrieved signals carry the master carrier's position and velocity information which can be solved on the slave carrier (as shown in FIG. 9). While the slave carrier receives the signals directly from the GPS satellites, the slave carrier can determine its position and velocity based on these direct measurements. Furthermore, carrier phase differential processing can be executed by the slave carrier to get the precise relative position between the master and slave carriers.

Assuming the GPS signals received by the master carrier are transmitted without delay, the GPS-like signal received by the slave carrier can be represented as:

$$\rho_{sm}^j = r_m^j + d_{sm} + \Delta ct$$

where, $\rho_{sm}^j$ is the pseudorange corresponding to the j th GPS satellite signal reflecting from the master carrier; $r_m^j$ is the geometrical distance between the master carrier and the j th GPS satellite; $d_{sm}$ is the geometrical distance between the master carrier and the slave carrier.

In the above equation, $\rho_{sm}^j$ can be derived by the GPS processor on the slave carrier after a GPS signal retrieving procedure, and the GPS satellite position can be determined through the extracted ephemeris. The master carrier position can be determined from the same equation, where there are essentially 4 unknowns, the 3-dimensional coordinate (x, y, z) of the master carrier, and the combination of the receiver clock bias and delay $d_{sm}$. $d_{sm}$ is the same for all satellites and will appear like a clock bias. These four unknows can be computed directly if four satellites are observed on the master carrier.

The position of the slave carrier can be determined from the direct GPS signals in the conventional manner. The relative position can be solved precisely from the differences in pseudorange and carrier phase between the direct GPS signal and those derived from the signals retransmitted by the master carrier. The equations are essentially identical to those of conventional kinematic positioning as the delay due to $d_{sm}$ looks like a receiver clock bias which will be cancelled in double difference carrier phase observables. Similarly, the velocity of the master carrier and the relative velocity between the master carrier and the slave carrier can be determined through the Doppler shift measurements. Time differentiation of the positioning equation gives:

$$\dot{\rho}_{sm}^j = \dot{r}_m^j + \dot{d}_{sm}$$

where: $\dot{\rho}_{sm}^j$ is the range rate corresponding to the j th GPS satellite signal reflecting from the master carrier; $\dot{r}_m^j$ is the range rate between the master carrier and the j th GPS satellite; $\dot{d}_{sm}$ is the range rate between the master carrier and the slave carrier.

The mutual relative positioning (MRP) system can be obtained by combining the master and slave subsystems together and installing them on each carrier.

The GPS receiver derives the range from the master carrier to the satellite plus the distance between the slave and master carriers through the determination of the GPS signal propagation delay. In a GPS receiver, the code delay-lock loop (DLL) is used to capture the GPS signal and measure the time shift. Two clocks are involved. One is the satellite clock tagging the signal emission time. The other is the receiver clock which records the signal reception time. An atomic time system, referred to as the GPS time, is applied to provide time reference for the whole system. The time shift measured by the code DLL is presented by $$\Delta t_{sm} = [t_R(GPS) - \delta_R] - [t^S(GPS) - \delta^S] - \tau_m$$

where $t_R(GPS)$ is the reception GPS time; $\delta_R$ is the receiver clock delay with respect to GPS time; $T^S$(GPS) is the signal emission GPS time; $\delta^S$ is the satellite clock delay with respect to GPS time; $\tau_m$ is the signal delay induced by the Frequency translator transmit system.

The bias $\delta^S$ of the satellite clock can be compensated by a polynomial model with the coefficients being transmitted in the first subframe of the navigation message. The other errors, such as the orbital error, the atmospheric refraction and the relativistic effect, are included in the term of $\Delta t(GPS)=t_R(GPS)-t^S(GPS)$. The equipment delay $\tau_m$ term is a known constant, which can be determined through testing. By correcting the satellite clock, the term $\delta^S$ vanishes from the above equation. Thus the time interval $\Delta t$ multiplied by the speed of light c yields the pseudorange $$R_{sm}=c\Delta t_{sm}=c\Delta t(GPS)-c\delta_R=\rho_m+d_{sm}-c\delta_R$$

In the above equation, $\rho_m$ corresponds to the distance between the position of the satellite at epoch $t^S(GPS)$ and the position of the master carrier at epoch $t_R(GPS)$; $d_{sm}$ is the distance between the master carrier and the slave carrier. Since $\rho_m$ is a function of two different epochs, it is often expanded into a Taylor series with respect to the signal emission time $$\rho_m = \rho_m(t^S, t_R) = \rho_m(t^S, t^S + \Delta t) = \rho_m(t^S, t^S) + \frac{d\rho_m}{dt}\bigg|_{(t^S,t^S)} \Delta t$$

In the navigation processing, the second term of the most-right hand side of the above equation is compensated by the following procedure. First, we can get an approximate $\Delta t$ by calculating the satellite position at epoch $t_R$. Then, the correct $\Delta t$ is obtained by introducing the satellite position at epoch ($t_R$—propagationdelay).

In order to accurately calculate the pseudorange measurement, all error sources should be considered to correct the term $\rho(t^S, t^s)$ in the above equation. Combining the direct pseudorange measurements, the code pseudorange model for master-slave relative positioning is given by $$R_s=\rho_s+c\delta^S-c\delta_R+\Delta^{eph}+\Delta^{iono}$$

$$R_{sm}=\rho_m+d_{sm}+c\delta^S-c\delta_R+\Delta^{eph}+\Delta^{iono}$$

where, $\rho_s$ is the true geometric distance between the slave carrier and satellite; $\rho_m$ is the true geometric distance between the master carrier and satellite; $\delta^S$ is the satellite clock bias; $\delta_R$ is the receiver bias; $\Delta^{eph}$ is the range error induced by the ephemeris error; $\Delta^{iono}$ is the propagation delay induced by the ionosphere.

Similarly, the carrier phase model for master-slave relative positioning is given by $$\Phi_s = \frac{1}{\lambda}\rho_s + N_s + f\delta^S - f\delta_R + \frac{\Delta^{eph}}{\lambda} - \frac{\Delta^{iono}}{\lambda}$$

$$\Phi_{sm} = \frac{1}{\lambda}\rho_{sm} + N_{sm} + f\delta^S - f\delta_R + \frac{\Delta^{eph}}{\lambda} - \frac{\Delta^{iono}}{\lambda}$$

where, $N_s$ the is the initial carrier phase integer ambiguity associated with the slave carrier; $N_{sm}$ is the initial carrier phase integer ambiguity associated with the slave carrier and the master carrier.

For satellite k, the carrier phase single difference (SD) results from the difference between the two equations in the above equation, as follows $$\Phi_{SD}{}^k=\frac{1}{\lambda}(\rho_s{}^k-\rho_{sm}{}^k)+N^k-f\Delta\delta$$

where $N_k=N_s{}^k-N_{sm}{}^k$ is the integer ambiguity associated with the two carriers; $\Delta\delta=\delta_{Rs}-\delta_{Rsm}$ is the difference between the two GPS receiver's clock biases.

The carrier phase double difference (DD) is a function of the carrier phase single difference:

$$\Phi_{DD}{}^{kj}=\Phi_{SD}{}^k-\Phi_{SD}{}^j$$

$$=\frac{1}{\lambda}(\rho_s{}^k-\rho_{sm}{}^k)-\frac{1}{\lambda}(\rho_s{}^j-\rho_{sm}{}^j)+N^{kj}$$

where $N^{kj}=N_s{}^k-N_{sm}{}^k$,$N_s{}^j+N_{sm}{}^j$ is the integer ambiguity associated with the two carriers.

The purpose of the corrected INS velocity-acceleration information aided GPS PLL loop is to estimate the carrier phase of the intermediate frequency signal $\theta_I(t)$ rapidly and accurately over a sufficiently short estimation period, and wherein $\theta_I(t)$ is approximated by $$\theta_I(t)=\theta_{I0}+\omega_{I0}t+\gamma_{I0}t^2+\delta_{I0}t^3+\ldots$$

The problem now becomes to estimate the parameters of the above equation. The velocity-acceleration information, which describes the flight vehicle dynamic characteristics, is translated into the line-of-sight (LOS) velocity-acceleration information. Therefore, the estimate of the carrier phase of the intermediate frequency signal can be formulated by LOS velocity-acceleration values as follows:

$$\hat\theta(t)=b_1V^{LOS}t+b_2A^{LOS}t^2+b_3a^{LOS}t^3+\ldots$$

where ($b_1$, $b_2$, $b_3$) are constants related to the carrier frequency and the speed of light, and are given by $$b_1 = \frac{4\pi f_c}{c}, b_2 = \frac{2\pi f_c}{c}, b_3 = \frac{4\pi f_c}{3c}$$

$V^{LOS}$, $A^{LOS}$ and $a^{LOS}$ correspond to the range rate, the range acceleration and the range acceleration rate along the LOS between the satellites and the receiver. Therefore, the tracking and anti-interference capabilities of the aided PLL loop seriously depend on the accuracy of $V^{LOS}$ and $A^{LOS}$ estimation. The $V^{LOS}$ and $A^{LOS}$ can be calculated from the information of velocity and acceleration coming from the INS processor 31 and then be incorporated into the loop filter in the GPS processor 20.

The code tracking loop of the GPS processor 20 tracks the code phase of the incoming direct sequence spread-spectrum signal. The code tracking loop provides an estimate of the magnitude of time shift required to maximize the correlation between the incoming signal and the internally generated punctual code. This information of time delay is used to calculate an initial vehicle-to-satellite range estimate, known as the pseudorange. The information of velocity and acceleration coming from the central navigation processor 30 is transformed into the LOS velocity and acceleration ($V^{LOS}$ and $A^{LOS}$) which are used to precisely estimate the code delay. By this way, the dynamic performance and anti-jamming capability are enhanced.

The central navigation processor 30, as shown in FIG. 2, receives the measurements coming from the IMU 10 and the GPS processor 20, in which the measurements are blended to derive high precision navigation information including 3-dimensional position, 3-dimensional velocity, and 3-dimensional attitude. These data are output from an INS processor 31 of the central navigation processor 30 and are passed to the I/O interface 40. Other avionics systems can read the navigation data from said I/O interface 40. As mentioned before, the velocity and acceleration information are also fed back to the GPS processor 20 to aid the global positioning system satellite signal code and carrier phase tracking.

The GPS processor 20 outputs the pseudornage, Doppler shifts, global positioning system satellite ephemeris, as well as atmosphere parameters to the Kalman filter 33 in which the data from the INS processor 31 and the GPS processor 20 are integrated to derive the position error, velocity error, and attitude error. The INS processor 31 processes the inertial measurements, which are body angular rates and specific forces, and the position error, velocity error, and attitude error coming from the Kalman filter 33 to derive the corrected navigation solution. The navigation solution includes 3-dimensional position, 3-dimensional velocity, and 3-dimensional attitude. These data are output into the Kalman filter 33. On the other hand, these data are also passed to the I/O interface 40 which provides a navigation data source for other avionics systems on board a vehicle where these avionics systems need navigation data or part of these data.

The central navigation processor 30, as shown in FIG. 2, receives the measurements from the IMU 10, the GPS processor 20, and the data link 50. Then, the measurements are combined to derive high precision navigation information including 3-dimensional position, 3-dimensional velocity, and 3-dimensional attitude. The central navigation processor 30 further comprises the following modules:

The INS processor 31 receives inertial measurements including body angular rates and specific forces from the IMU 10;outputs navigation data (position, velocity, and attitude) into the I/O interface 40. Therefore, other avionics systems can read the navigation data from the I/O interface 40. As mentioned before, the velocity and acceleration information from the INS processor 31 is also fed back to the GPS processor 20 to aid the GPS code and carrier phase tracking;

The GPS processor 20 receives GPS RF (radio frequency) signals from the GPS satellites and outputs the pseudorange, Doppler shifts, GPS satellite ephemerides, as well as atmospheric parameters to the Kalman filter 33;

The new satellites/cycle slips detection module 34 receives the navigation data from the INS processor 31, GPS rover measurement from the GPS processor 20, GPS reference measurement from the data link and determines if new GPS satellites come in view or cycle slips occur;

The on-the-fly ambiguity resolution module 32 receives the navigation data from the INS processor 31, GPS rover measurement from the GPS processor 20, GPS reference measurement from the data link and is activated when new GPS satellites come in view or cycle slips occur to fix the ambiguity integer;

The Kalman filter 33 integrates the data from the INS processor 31, the GPS processor 20, and the data link 50 to estimate the position error, velocity error, and attitude error. Then, the INS processor 31 processes the inertial measurements, which are the body angular rates and specific forces, and the estimated errors from the Kalman filter 33 to derive the corrected navigation solutions (position, velocity, and attitude). The corrected navigation solutions are output into the Kalman filter 33 and also passed to the I/O interface 40 which provides a navigation data source for other avionics systems on board a vehicle.

It is well known that the receiver measurement noise for the L1 and L2 frequencies is about 1.9 mm and 2.4 mm, respectively, while the receiver measurement noise for P(Y) and C/A codes is about 0.3 m and 3 m, respectively. However, the high accuracy of positioning with GPS carrier phase measurements is based on the prior condition that the phase ambiguities have been resolved. The ambiguity inherent with phase measurements depends upon both the global positioning system receiver and the satellite. Under the ideal assumptions of no carrier phase tracking error and the known true locations of the receiver and satellite, the ambiguity can be resolved instantaneously through a simple math computation. However, there is the presence of satellite ephemeris error, satellite clock bias, atmospheric propagation delay, multipath effect, receiver clock error and receiver noise in range measurements from the GPS code and phase tracking loops.

For GPS measurements, the double difference equations for L1 and L2 frequencies are (scalar equations)

$$P_{k_{mr}}^{ij} = \rho_{mr}^{ij} + \rho_{cmr}^{ij} + \frac{I_{mr}^{ij}}{f_k^2} + T_{mr}^{ij} + d_{pc_{k_{mr}}}^{ij} + M_{P_{k_{mr}}}^{ij} + \varepsilon_{P_{k_{mr}}}^{ij}$$

$$\Phi_{k_{mr}}^{ij} = \rho_{mr}^{ij} + \rho_{cmr}^{ij} + \lambda_k N_{k_{mr}}^{ij} - \frac{I_{mr}^{ij}}{f_k^2} + T_{mr}^{ij} + d_{pc_{k_{mr}}}^{ij} + M_{\Phi_{k_{mr}}}^{ij} +$$

$$\varepsilon_{\Phi_{k_{mr}}}^{ij}, (k = 1, 2)$$

where $(\cdot)_{mr}^{ij}$ means double difference which is formed by $(\cdot)_m^i - (\cdot)_m^j - (\cdot)_r^i + (\cdot)_r^j$. The subscripts m and r denote two (reference and rover) receivers and the superscripts i and j represent two different GPS satellites. P and $\Phi$ are the pseudorange and phase range measurements, respectively. $\rho$ is the geometric distance between the phase centers of two antennas (a GPS user's receiver and a GPS satellite) at the nominal time and $\rho_c$ refers to the correction of nominal geometrical distance. $\lambda$ represents wavelength. $N_{mr}^{ij}$ is the double difference integer ambiguity.

$$\frac{I_{mr}^{ij}}{f_k^2}$$

is the double difference residual of the ionospheric effect for L1 or L2 frequency and $T_{mr}^{ij}$, denotes the double difference residual of the tropospheric effect. $d_{pc_{()_{mr}}}$ refers as the double difference residuals of phase center variations. $M_{(\cdot)_{mr}}^{ij}$ denotes the double difference residuals of multipath effect. The definitions of the wide lane and narrow lane phase range measurements are $$\Phi_{w_{mr}}^{ij} = \frac{f_1}{f_1 - f_2}\Phi_{1_{mr}}^{ij} - \frac{f_2}{f_1 - f_2}\Phi_{2_{mr}}^{ij}$$

$$\Phi_{n_{mr}}^{ij} = \frac{f_1}{f_1 + f_2}\Phi_{1_{mr}}^{ij} + \frac{f_2}{f_1 + f_2}\Phi_{2_{mr}}^{ij},$$

respectively, and the corresponding integer ambiguities are $$N_{w_{mr}}^{ij} = N_{1_{mr}}^{ij} - N_{2_m}^{ij}$$

$$N_{n_m}^{ij} = N_{1_{mr}}^{ij} + N_{2_{mr}}^{ij}$$

respectively. Therefore, the frequencies for the wide lane and narrow lane ambiguities are equal to $f_w = f_1 - f_2$ and $f_n = f_1 + f_2$, respectively. Linearly combining the L1 and L2 equations and using $t_k$ to represent time at epoch k, the sequentially averaged approximated double difference wide lane ambiguity (real number) is expressed as $$\overline{N}_{w_{mr}}^{ij}(t_k) = \frac{\sum_{i=1}^{k} \tilde{N}_{w_{mr}}^{ij}(t_i)}{k} = \frac{(k-1)\overline{N}_{w_{mr}}^{ij}(t_{k-1}) + \tilde{N}_{w_{mr}}^{ij}(t_k)}{k} \quad (1)$$

and the approximated double difference narrow lane ambiguity (real number) is given by $$\tilde{N}_{n_{mr}}{}^{ij} \approx (\lambda_w N_{w_{mr}}{}^{ij} - \overline{\Phi}_{IS_{mr}}{}^{ij} + d_{pc_{wmr}}{}^{ij} - d_{pc_{nmr}}{}^{ij})/\lambda_n, \quad (2)$$

where $$\tilde{N}_{w_{mr}}{}^{ij} \approx (\Phi_{w_{mr}}{}^{ij} - P_{n_{mr}}{}^{ij} - d_{pc_{wmr}}{}^{ij} + d_{pc_{nmr}}{}^{ij})/\lambda_w,$$

$$\overline{\Phi}_{ISmr}^{ij}(t_k) = \frac{\sum_{i=1}^{k} \Phi_{ISmr}^{ij}(t_i)}{k} = \frac{(k-1)\overline{\Phi}_{ISmr}^{ij}(t_{k-1}) + \Phi_{ISmr}^{ij}(t_k)}{k},$$

$\Phi_{IS_{mr}}{}^{ij} = \Phi_{w_{mr}}{}^{ij} - \Phi_{n_{mr}}{}^{ij}$ denotes the ionospheric signal observation, $$P_{n_{mr}}^{ij} = \frac{f_1}{f_1 + f_2} P_{1mr}^{ij} + \frac{f_2}{f_1 + f_2} P_{2mr}^{ij},$$

$$d_{pc_{wmr}}^{ij} = \frac{f_1}{f_1 - f_2} d_{pc_{1mr}}^{ij} - \frac{f_2}{f_1 - f_2} d_{pc_{2mr}}^{ij},$$

and $$d_{pc_{nmr}}^{ij} = \frac{f_1}{f_1 + f_2} d_{pc_{1mr}}^{ij} + \frac{f_2}{f_1 + f_2} d_{pc_{2mr}}^{ij} \cdot \lambda_w$$

and $\lambda_n$ refer to the wavelengths of the wide lane and narrow lane ambiguities, respectively. Also, the ionosphere-free models for pseudorange and phase range are defined as $$P_{IF\ mr}^{ij} = \frac{f_1^2}{f_1^2 - f_2^2} P_{1mr}^{ij} - \frac{f_2^2}{f_1^2 - f_2^2} P_{2mr}^{ij}$$

$$\Phi_{IF\ mr}^{ij} = \frac{f_1^2}{f_1^2 - f_2^2} \Phi_{1mr}^{ij} - \frac{f_2^2}{f_1^2 - f_2^2} \Phi_{2mr}^{ij},$$

respectively.

The advantage of the IMU aiding phase ambiguity resolution and cycle slip detection is that the precision vehicle coordinates and velocity from the corrected INS solution are available to aid in determining the original ambiguities and the search volume. Additionally, the INS aiding signal tracking enhances the receiver's capability to hold the global positioning system satellite signal, thus the probability of signal loss or cycle slip is reduced.

Referring to FIG. 2, the on-the-fly ambiguity resolution module 32 is activated when the new satellites/cycle slips detection module 34 is on, and, therefore, collects the position and velocity data from the INS processor 31, the rover raw and Doppler shift measurements from the GPS processor 20 and the reference raw measurements, Doppler shift measurements, position, and velocity from the data link 50 to fix the integer ambiguities. After fixing of the integer ambiguities, the integer ambiguities are passed to the Kalman filter 33 to further improve the measurement accuracy of the global positioning system raw data.

Figure 3:
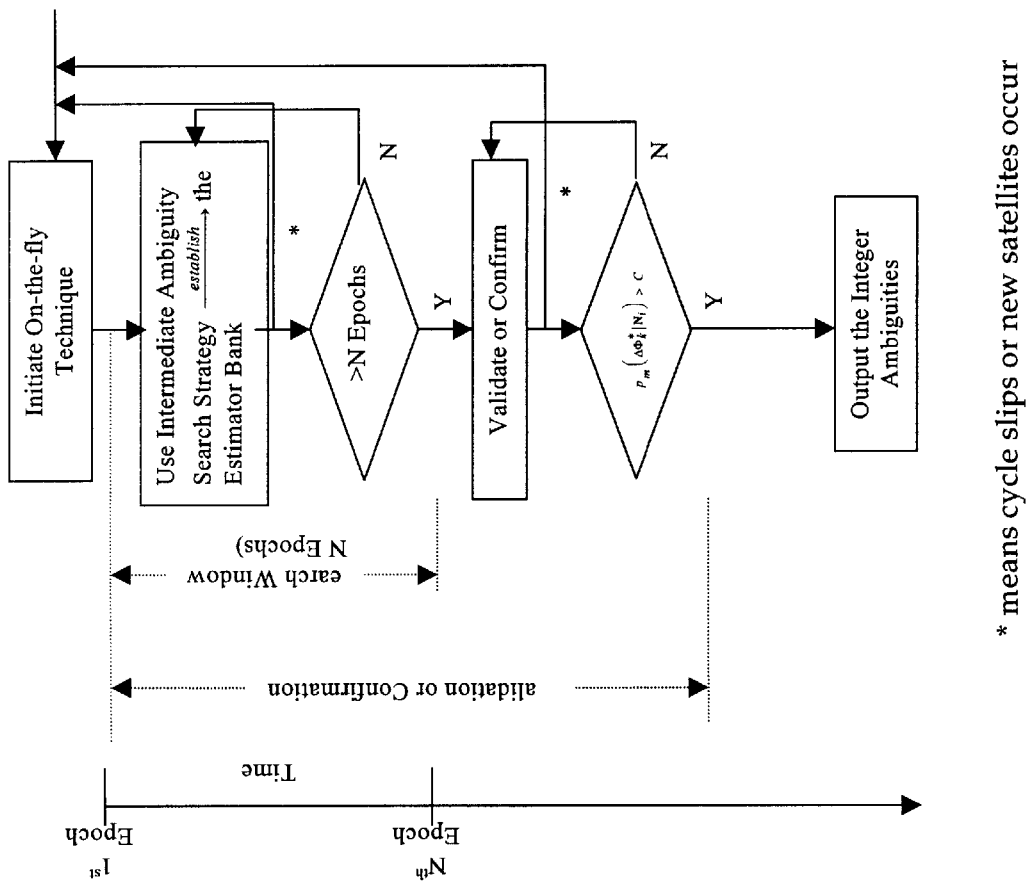
FIG. 3 is a flow diagram of the new process for on-the-fly ambiguity resolution technique of the present invention.

FIGS. 3, 4, 5, and 6 represent the method and process used for the on-the-fly ambiguity resolution module 32. FIG. 3 shows the process of the on-the-fly ambiguity resolution module 32. When the on-the-fly ambiguity resolution module 32 is on, a search window is set up. The search window comprises several time epochs (assumed N epochs). Within the search window, an intermediate ambiguity search strategy (IASS) is used to search an integer ambiguity set at each epoch.

The on-the-fly ambiguity resolution module 32 performs the following steps:

(a) initiating an on-the-fly ambiguity resolution module as the new satellites/cycle slips detection module is on, i.e., the new satellites or cycle slips occur;

(b) fixing integer ambiguities to estimate a more accurate vehicle navigation solution, (c) sending the selected integer ambiguities from the on-the-fly ambiguity resolution module to the Kalman filter The above step (b) further comprises:

(b.1) using intermediate ambiguity search strategy (IASS) and estimator bank to set up ambiguity set and determine the ambiguity integer;

(b.2) validating and confirming the ambiguity integer.

Basically, IASS comprises the "simplified" least-squares method and the extrawidelaning technique. Before using the least-squares method to search the ambiguities, the observable common satellites between two antennas (reference and rover) are divided into two groups:

the primary satellites and the secondary satellites. Since the double difference equations are used, the satellite with the highest elevation is defined as the reference satellite. The primary satellites include the next four higher elevation satellites, i.e., there are four independent double difference equations.

The rest of the observable satellites are categorized into the secondary satellites.

Figure 4:
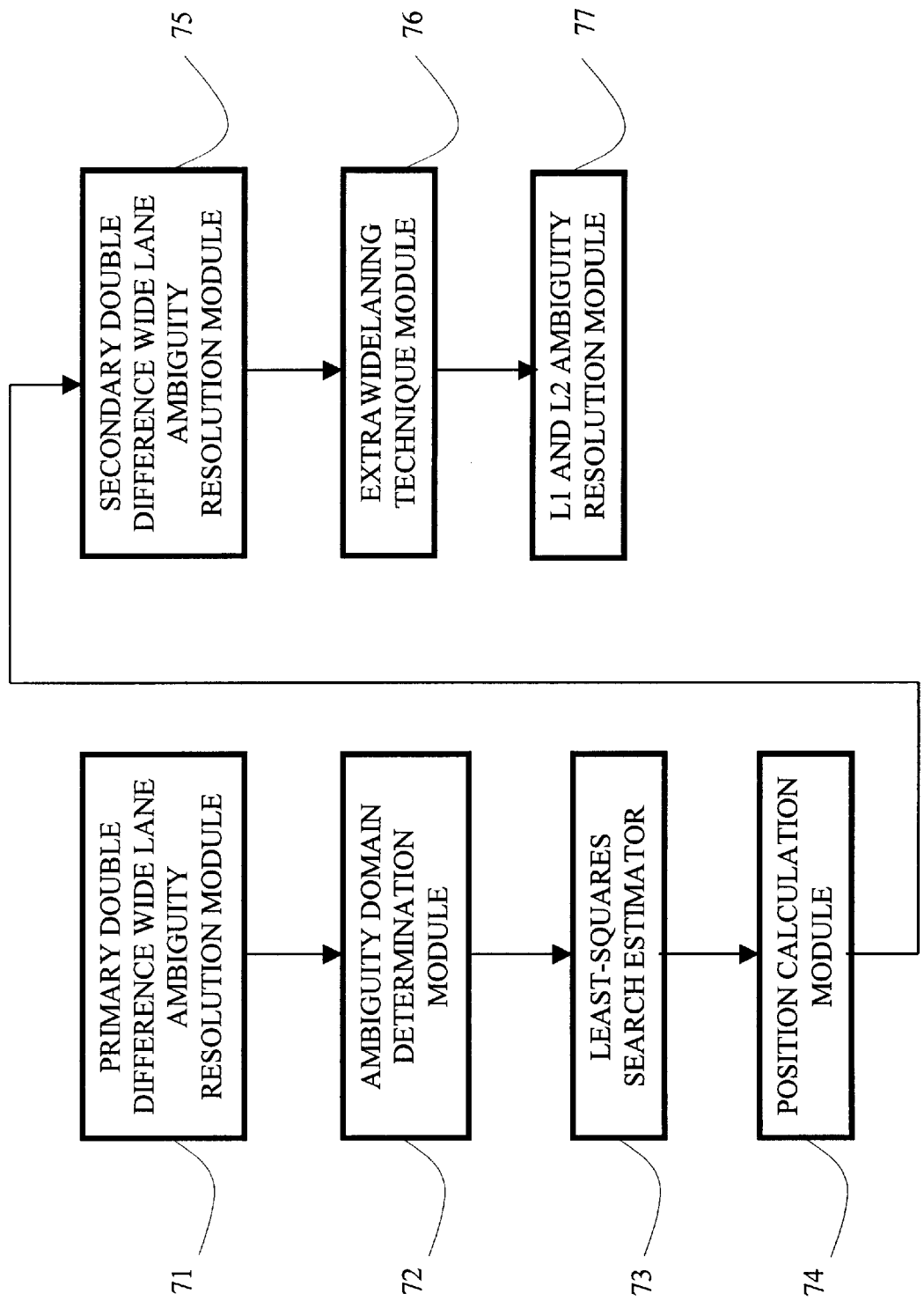
FIG. 4 is a flow diagram of intermediate ambiguity search strategy (IASS) according to the new process for on-the-fly ambiguity resolution technique of the present invention.

As shown in FIG. 4, the IASS process comprises of a primary double difference wide lane ambiguity resolution module 71, an ambiguity domain determination module 72, a least-squares search estimator 73, a position calculation module 74, a secondary double difference wide lane ambiguity resolution module 75, an extrawidelaning technique module 76, and a L1 and L2 ambiguity resolution module 77.

The first step of the IASS is to resolve the primary double difference wide lane ambiguities in the primary double difference wide lane ambiguity resolution module 71. The a priori information about the rover position (obtained from ionosphere-free pseudorange measurements) and the approximated double difference wide lane ambiguities (Equation (1)) are combined with the primary double difference wide lane phase range measurements to form the simultaneous equations. Also, the a priori information about the rover position can be given by the output of the INS processor 31. Use the minimum variance with a priori information to estimate the rover position and primary double difference wide lane ambiguities.

After the estimation of the primary double difference wide lane ambiguities, the estimated primary double difference wide lane ambiguities and the corresponding cofactor matrix are sent to the ambiguity domain determination module 72, wherein an ambiguity search domain is established based on the estimated double difference wide lane ambiguities and the corresponding cofactor matrix. The ambiguity search domain is sent to the least-squares search estimator 73. A standard least-squares search method is applied to search the ambiguity set in the least-squares search estimator 73. Also, the standard least-squares search method can be simplified to accelerate the ambiguity search. The "simplified" least-squares search method is defined as directly searching the ambiguity set, that minimizes the quadratic form of residuals $$R_i = (\hat{x}_N - n_i)^T P_{\hat{x}_N}^{-1} (\hat{x}_N - n_i)$$

where $\hat{x}_N$ is the optimal estimate vector of the double difference wide lane ambiguities (real number), $n_i$ is the double difference wide lane ambiguity vector within the search domain (integer number), and $P_{\hat{x}N}$ is the cofactor matrix corresponding to the optimal double difference wide lane ambiguity estimate, without using statistical or empirical tests (because the estimator bank will execute the task of confirmation).

The fixed primary double difference wide lane ambiguities are sent to the position calculation module 74 to compute the rover position. The calculated rover position is sent to the secondary double difference wide lane ambiguity resolution module 75 to fix the secondary double difference wide lane ambiguities by applying the primary wide-lane-ambiguity-fixed rover position solution into the secondary double difference wide lane phase measurements.

Substituting the resolved double difference wide lane ambiguities into Equation (2), the approximated double difference narrow lane ambiguities (real numbers) are calculated. The extrawidelaning technique states that if the wide lane ambiguity is even (or odd), the corresponding narrow ambiguity is even (or odd), and vice versa. Using the extrawidelaning technique, the narrow lane ambiguities can be resolved in the extrawidelaning technique module 76. Therefore, in the L1 and L2 ambiguity resolution module 77, the L1 and L2 ambiguities are calculated from the combination of the wide lane ambiguities and narrow lane ambiguities, which correspond to $$N_{1mr}^{ij} = \frac{N_{wmr}^{ij} + N_{nmr}^{ij}}{2}$$

and $$N_{2mr}^{ij} = \frac{N_{nmr}^{ij} - N_{wmr}^{ij}}{2},$$

respectively.

Figure 5:
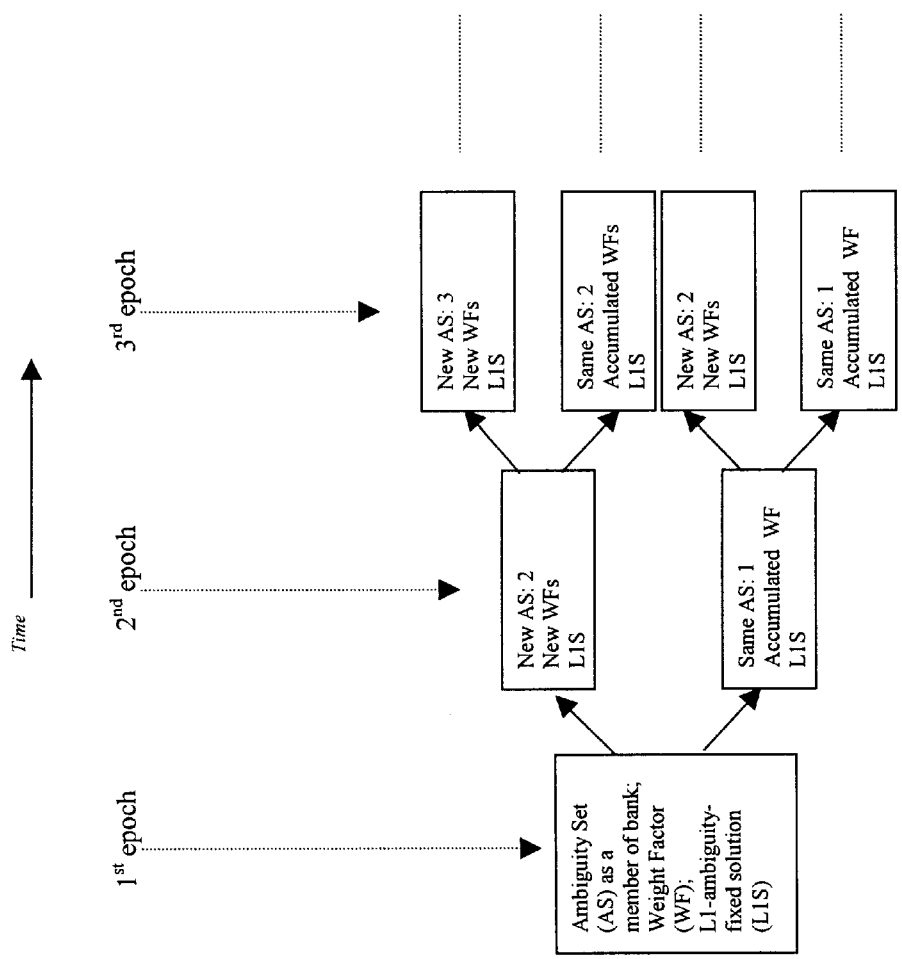
FIG. 5 is a block diagram of the procedure for forming the estimator bank according to the new process for on-the-fly ambiguity resolution technique of the present invention.
Figure 6:
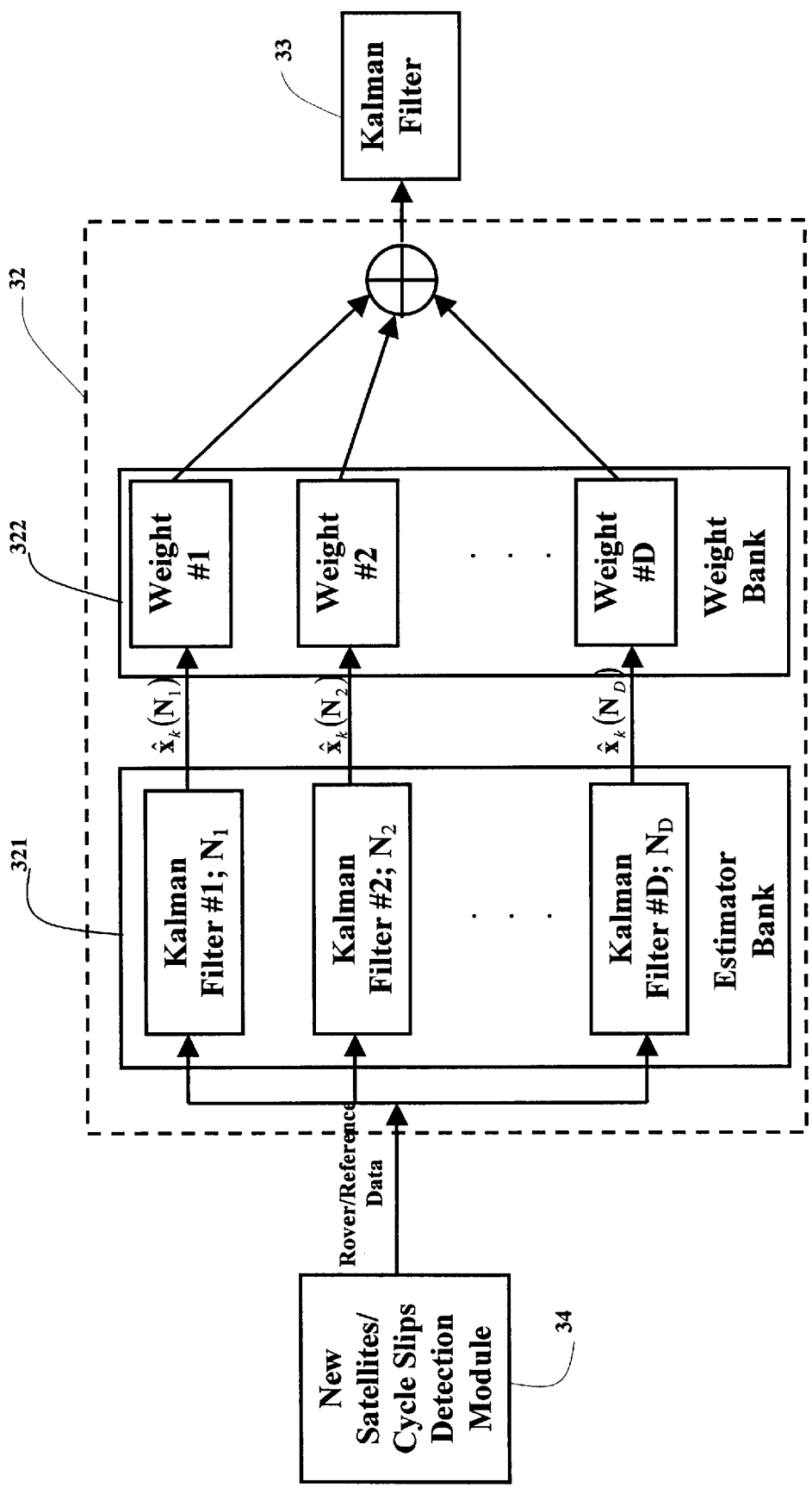
FIG. 6 is a complete form of the estimator bank according to the new process for on-the-fly ambiguity resolution technique of the present invention.

Returning to FIG. 3, when the current ambiguity set from the IASS is different from the one(s) from the previous epoch(s), the current ambiguity set becomes a new member of an estimator bank 321 and a corresponding weight bank 322. When the current ambiguity set is the same as one of the previous ambiguity set(s) in the estimator bank 321, the number of Kalman filters in the estimator bank 321 remains. The complete form of the estimator bank 321 and weight bank 322 is depicted in FIG. 6. The process for establishing the estimator bank 321 and weight bank 322 is shown in FIG. 5 and comprises the following steps:

1. Search the integer ambiguity set at the first epoch of the search window by using the IASS. The integer ambiguity set becomes a member of the estimator bank 321 because there is no member in the estimator bank 321 before the first epoch. Based on the ambiguity set and phase measurements, the rover position (ambiguity-fixed solution) is estimated, and then a corresponding weight is calculated in the weight bank 322. The calculation of the weight is according to $$p_m(N_i|\Delta\Phi_k^*) = \frac{p_m(\Delta\Phi_k^*|N_i)}{\sum_{j=1}^{D} p_m(\Delta\Phi_k^*|N_j)}, i = 1, 2, \ldots, D \quad (3)$$

where $$p_m(\Delta\Phi_k^*|N_i) = p_m(\Delta\Phi_k|\Delta\Phi_{k-1}, \Delta\Phi_{k-2}, \ldots, \Delta\Phi_1, N_i) p_m(\Delta\Phi_{k-1}^*|N_i), i = 1, 2, \ldots, D \quad (4)$$

and the first term of the product can be expressed as $$p_m(\Delta\Phi_k|\Delta\Phi_{k-1}, \Delta\Phi_{k-2}, \ldots \Delta\Phi_1, N_i) = \frac{1}{\sqrt{(2\pi)^r det(cov(\Delta\Phi_k))}} \cdot \exp\left(-\frac{\hat{z}_k^T cov(\Delta\Phi_k)^{-1} \hat{z}_k}{2}\right), i = 1, 2, \ldots, D$$

which is assumed and defined as a Gaussian distribution.

Equation (4) states the accumulative property of $p_m(\Delta\Phi_k^*|N_i)$, where $p_m(\Delta\Phi_k^*|N_i)$ represents the probability mass function of the measurement sequence $\Delta\Phi_k^* = \{\Delta\Phi_1 \Delta\Phi_2, \ldots, \Delta\Phi_k\}$ up to the current time $t_k$ conditioned by the individual ambiguity set $N_i$. In other words, the calculation of the weight depends on not only the data of the current epoch but also the data of the previous epochs. $det(\cdot)$ and $(\cdot)^{-1}$ denote the determinant and the inverse of a matrix, respectively. $\bar{z}_k$ is the optimal measurement residual (measurement value—the optimal computed value) at time $t_k$ and $cov(\Delta\Phi_k) = E\{\bar{z}_k \bar{z}_k^T\}$ is the covariance matrix of the measurement at the time $t_k$. r is the dimension of the measurement at each epoch. For the first epoch ($t_1$) (k=1) of the search window, Equation (4) (probability) becomes $$p_m(\Delta\Phi_1^*|N_i) = \frac{1}{\sqrt{(2\pi)^r det(cov(\Delta\Phi_k))}} \cdot \exp\left(-\frac{\hat{z}_k^T cov(\Delta\Phi_k)^{-1} \hat{z}_k}{2}\right), \quad (5)$$

$$i = 1, 2, \ldots, D$$

Of course, the value of the only weight (D=1 in Equation (3)) in the weight bank 322 is equal to one. The optimal rover position for this epoch is equal to the rover position multiplied by the corresponding weight. Based on the optimal rover position and the Doppler shifts, the rover velocity is estimated.

2. Search the ambiguity set by using the IASS at the second epoch of the search window. Two situations may occur:

2-1. When the integer ambiguity set is the same as the one of the previous epoch (epoch one), the number of the Kalman filters in the estimator bank 321 is still one, as shown in the lower part of FIG. 5. Based on the ambiguity set and the phase measurements (for epoch two), the rover position (ambiguity-fixed solution) can be estimated and the corresponding weight in the weight bank 322 is calculated cumulatively (i.e. Equations (3) and (4), where D=1). The optimal rover position for epoch two is equal to the rover position multiplied by the associated weight (naturally, for this case the value of the weight is equal to one). Based on the optimal rover position and the Doppler shifts, the rover velocity is estimated.

2-2. When the integer ambiguity set is different from the one of the previous epoch (epoch one), the current ambiguity set becomes a new member of the estimator bank 321, i.e., the number of the Kalman filters in the estimator bank 321 is two, as shown in the upper part of FIG. 5. Based on each ambiguity set and the same phase measurements (for epoch two), the individual rover position (ambiguity-fixed solution) can be estimated and the calculation of each corresponding weight in the weight bank 322 is based on Equations (3) and (5) (where D=2). In other words, when new ambiguity set is resolved, each corresponding weight in the weight bank 322 is calculated from scratch. The optimal rover position for epoch two is equal to the sum of the individual rover position multiplied by the associated weight. Based on the optimal rover position and the Doppler shifts, the rover velocity is estimated.

3. Follow the same procedure as described in step 2 for the rest of the epochs of the search window. At the last epoch (epoch N) of the search window, after the search of IASS, the estimator bank 321 and weight bank 322 are completely established (referred to FIG. 6).

Referring to FIG. 3, after the period of the search window, still, the phase measurements (reference and rover) are input into the complete estimator bank 321 (as shown in FIG. 6). As shown in FIG. 6, each Kalman filter in the estimator bank 321 has its own ambiguity set, which is selected by the IASS during the search window. Therefore, the number of the Kalman filters, D, in the estimator bank 321 is an arbitrary positive integer number which depends on the number of the different ambiguity sets from the search of the IASS during the search window. Based on each ambiguity set and the phase measurements, the individual rover position (ambiguity-fixed solution) can be estimated and each corresponding weight in the weight bank 322 is calculated cumulatively (based on Equations (3) and (4)). Thus, the optimal rover position is equal to the sum of the individual rover position multiplied by the associated weight. Based on the optimal rover position and the Doppler shifts, the rover velocity is estimated. Follow the same procedure until a criterion is met. The criterion is defined as $$p_m(\Delta\Phi_k^* | N_i) > C$$

where C denotes a very large uncertainty to make sure that the ambiguity set is robust enough. After the criterion is met, the estimator bank 321 and weight bank 322 stop functioning and output the selected integer ambiguities into the Kalman filter 33 (referred to FIG. 2). During the confirmation period (from the first epoch of the search window to the epoch when the estimator bank 321 and weight bank 322 stop functioning), the estimator bank 321 and the weight bank 322 identify the correct integer ambiguity set and estimates the rover position in real time. One important characteristic of the estimator bank 321 and weight bank 322 is that the weight in the weight bank 322 corresponding to the correct integer ambiguity in the estimator bank 321 is approaching one while the others (corresponding to the rest of the ambiguity sets) are converging to zero. Therefore, the correct (selected) integer ambiguity set is the one with the weight close to one. During the whole procedure, when new satellites or cycle slips occur, the on-the-fly ambiguity resolution module will be initiated (on).

Figure 7:
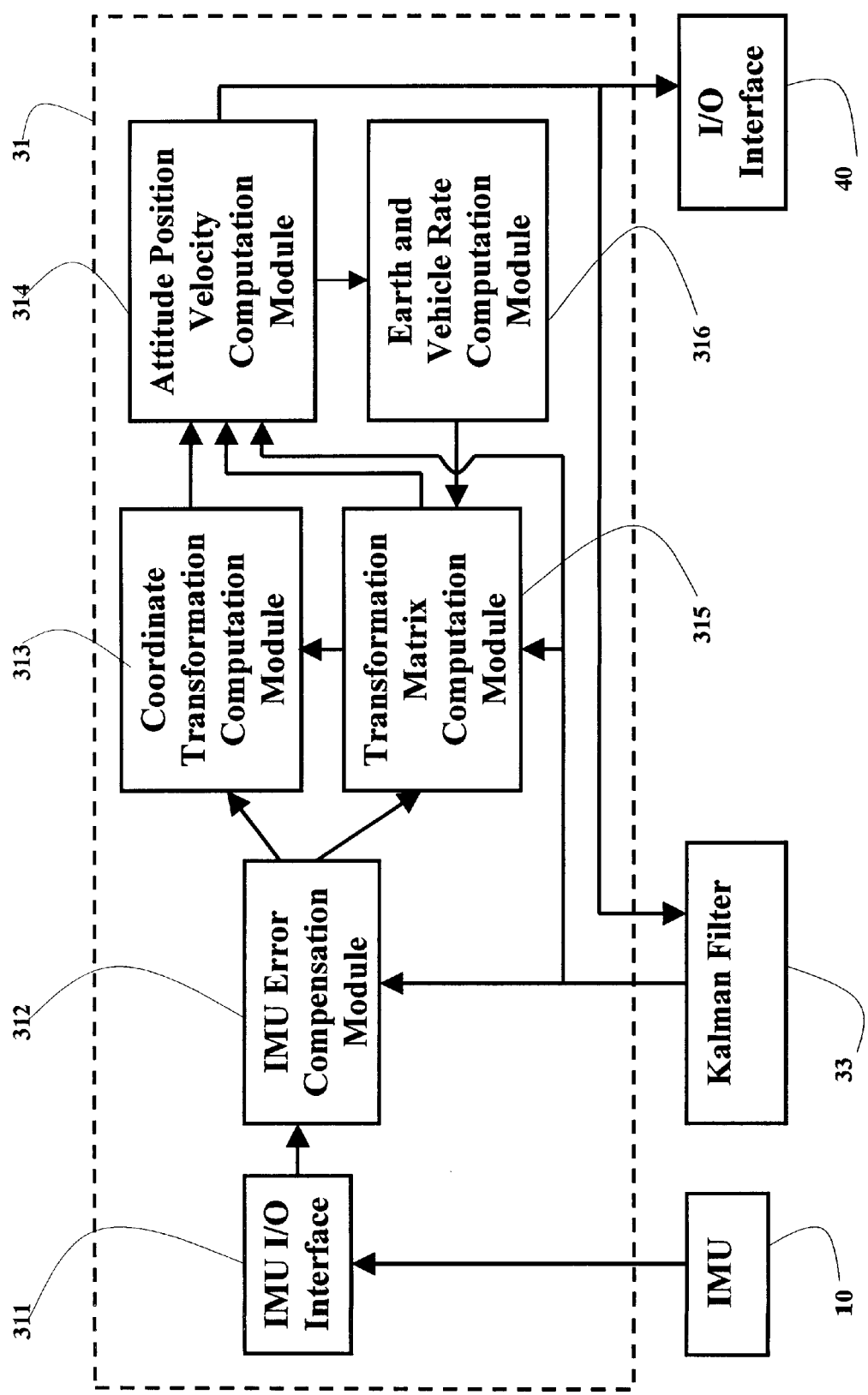
FIG. 7 is a block diagram of the inertial navigation system processing, which receives the navigation state corrections from a Kalman filter according to the above preferred embodiment of the present invention.

Referring to FIG. 7, the INS processor 31 comprises an IMU I/O interface 311, an IMU error compensation module 312, a coordinate transformation computation module 313, an attitude position velocity computation module 314, a transformation matrix computation module 315, and an earth and vehicle rate computation module 316.

The IMU I/O interface 311 collects the signal of the body angular rates and specific forces from the IMU 10 for processing and converting it to digital data, which are corrupted by the inertial sensor measurement errors. These contaminated data are passed to the IMU error compensation module 312. The IMU error compensation module 312 receives the sensor error estimates derived from the Kalman filter 33 to perform IMU error mitigation on the IMU data. The corrected specific forces and the body angular rates are sent to the coordinate transformation computation module 313 and the transformation matrix computation module 315, respectively.

In addition to the corrected body angular rates from the IMU error compensation module 315, the transformation matrix computation module 315 also receives the earth and vehicle rate from the earth and vehicle rate computation module 316 to perform transformation matrix computation. The transformation matrix computation module 315 sends the transformation matrix to the coordinate transformation computation module 313 and attitude position velocity computation module 314. The attitude update algorithm in the transformation matrix computation module 315 uses the quaternion method because of its advantageous numerical and stability characteristics. The differential equation of the relative quaternion between the body frame and the local navigation frame is:

$$\dot{q} = \tfrac{1}{2}[\Omega_b]q - \tfrac{1}{2}[\Omega_n]q$$

where $q^T = [q_0 \ q_1 \ q_2 \ q_3]$ is a four-component vector of quaternion parameters and the four components are defined as follows:

$$q_0 = \cos \Delta\theta/2$$

$$q_1 = \cos \alpha \sin \Delta\theta/2$$

$$q_2 = \cos \beta \sin \Delta\theta/2$$

$$q_3 = \cos \gamma \sin \Delta\theta/2$$

where $\Delta\theta$ is the rotation angle and $\alpha$, $\beta$, and $\gamma$ are the angles between the axis of rotation and the axes of a coordinate system. For instance, they are the angles with respect to the roll, pitch, and yaw axes. Also, the quaternions satisfy the condition $$q_0^2 + q_1^2 + q_2^2 + q_3^2 = 1.$$

$\Omega_b$ is the skew-symmetric matrix of the vector, $\omega_{ib}^b$, which is sensed by the gyro and is the rotation rate vector of the body frame (b) relative to the inertial frame (i) in the body frame, and both are expressed as $$[\Omega_b] = \begin{bmatrix} 0 & -\omega_{bx} & -\omega_{by} & -\omega_{bz} \\ \omega_{bx} & 0 & \omega_{bz} & -\omega_{by} \\ \omega_{by} & -\omega_{bz} & 0 & \omega_{bx} \\ \omega_{bz} & \omega_{by} & -\omega_{bx} & 0 \end{bmatrix},$$

$$\omega_{ib}^b = [\omega_{bx}, \omega_{by}, \omega_{bz}]^T.$$

$\Omega_n$ is the skew-symmetric matrix of the vector, $\omega_{in}^n$, which is the rotation rate vector of the local navigation frame (n) relative to the inertial frame in the navigation frame, and both are expressed as $$[\Omega_n] = \begin{bmatrix} 0 & -\omega_{nx} & -\omega_{ny} & -\omega_{nz} \\ \omega_{nx} & 0 & \omega_{nz} & -\omega_{ny} \\ \omega_{ny} & -\omega_{nz} & 0 & \omega_{nx} \\ \omega_{nz} & \omega_{ny} & -\omega_{nx} & 0 \end{bmatrix},$$

$$\omega_{in}^n = [\omega_{nx}, \omega_{ny}, \omega_{nz}]^T.$$

If the navigation frame is the local level North, East, and Down (NED) navigation frame, then $$\omega_{in}^n = \begin{bmatrix} (\omega_e + \dot{\lambda})\cos L \\ -\dot{L} \\ -(\omega_e + \dot{\lambda})\sin L \end{bmatrix}$$

where $\omega_e$ is the Earth's rotation rate, L is the geodetic latitude, and λ is the longitude.

The coordinate transformation module 313 collects the specific forces from the IMU error computation module 312 and the transformation matrix from the transformation matrix computation module 315 to perform the coordinate transformation. The coordinate transformation computation sends the specific forces transferred into the coordinate system presented by the transformation matrix to the attitude position velocity computation module 314.

The attitude position velocity computation module 314 receives the transformed specific forces from the coordinate transformation computation module 313 and the transformation matrix from the transformation matrix computation module 315 to perform the attitude, position, velocity update. A general navigation equation that describes the motion of a point mass over the surface of the Earth or near the Earth has the following form:

$$\dot{V}(t) = a - (2\omega_{ie} + \omega_{en}) \times V - \omega_{ie} \omega \times r$$

where a and V are the acceleration and velocity of the vehicle relative to the Earth in the navigation frame, $\omega_{ie}$ is the Earth rotation vector, $\omega_{en}$ is the angular rate of the navigation frame relative to the earth, and r is the position vector of the vehicle with respect to the Earth's center.

Because the accelerometers do not distinguish between vehicle acceleration and the mass attraction gravity, the specific vector, f, sensed by the accelerometers is:

$$f = a - g(r)$$

where g(r) is a combination of the earth's gravity and the centrifugal force at the vehicle location. Thus, $$\dot{V}(t) = f - (2\omega_{ie} + \omega_{en}) \times V + g(r)$$

where, $\omega_{ie}^n = \begin{bmatrix} \omega_e \cos L \\ 0 \\ -\omega_e \sin L \end{bmatrix}$, $\omega_{en}^n = \begin{bmatrix} \dot{\lambda} \cos L \\ -\dot{L} \\ -\dot{\lambda} \sin L \end{bmatrix}$.

The vehicle velocity is updated by the following:

$$\dot{V}^n = C_b^n f^b + M V^n + g^n$$

where $C_b^n$ is the direction cosine matrix from the body frame to the navigation frame, $$f^b = \begin{bmatrix} f_{bx} \\ f_{by} \\ f_{bz} \end{bmatrix}, \quad V^n = \begin{bmatrix} v_n \\ v_e \\ v_d \end{bmatrix}, \quad g^n = \begin{bmatrix} 0 \\ 0 \\ g_d \end{bmatrix}, \text{ and}$$

$$M = \begin{bmatrix} 0 & -(2\omega_e + \dot{\lambda})\sin L & \dot{L} \\ (2\omega_e + \dot{\lambda})\sin L & 0 & (2\omega_e + \dot{\lambda})\cos L \\ -\dot{L} & -(2\omega_e + \dot{\lambda})\cos L & 0 \end{bmatrix}$$

For the WGS-84 ellipsoid, the normal gravity formula is the following expression:

$$g_d = g_0[1 - 2(1 + f + m)h/a + (5/2 m - f)\sin^2 L]$$

where $m = \omega_{ie}^2 a^2 b / GM$, $g_0$ is the gravity at the equator, f is the elliptical flattening, h is the altitude, a is the semi-major axis value, b is the semi-minor axis value, and GM is the earth's gravitational constant.

The differential equations for the position update of the geodetic latitude, L, longitude, λ, and height, h, are given by:

$$\dot{L} = \frac{V_n}{R_M + h}, \quad \dot{\lambda} = \frac{V_e}{(R_N + h)\cos L}, \quad \dot{h} = -v_d$$

where $R_M$ is the radius of the curvature in the Meridian and $R_N$ is the radius of the prime vertical.

After the computation of the position and velocity, the position and velocity errors calculated by the Kalman filter 33 are used in the attitude position velocity computation module 314 to correct the inertial solution. For the attitude correction, there are two executable approaches. First approach is to send the attitude errors computed by the Kalman filter 33 to the attitude position velocity computation module 314 to perform attitude correction in the attitude position velocity computation module 314. The second approach is to send the attitude errors computed by the Kalman filter 33 to the transformation matrix computation module 315 to perform the attitude correction before the attitude position velocity computation module 314.

The corrected inertial solution obtained from the attitude position velocity computation module 314 is passed to the Kalman filter 33 to construct the measurements of the Kalman filter 33. The corrected inertial navigation solution is also sent to the carrier phase integer ambiguity resolution module 32 to aid the resolution of the integer ambiguities. The corrected velocity and acceleration is passed to the GPS processor 20 to aid the global positioning system satellite signal carrier phase and code tracking. Also, the attitude, position, and velocity information is sent to the I/O interface 40 which provides a navigation data source for other avionics systems onboard a vehicle. Furthermore, the attitude, position, and velocity computed by the attitude position velocity computation module 314 are sent to the earth and vehicle rate computation module 316 to calculate the Earth rotation and the vehicle rotation rate. The calculated Earth and vehicle rates are sent to the transformation matrix computation module 315.

It is well known that the Kalman filter produces optimal estimates with well defined statistical properties. The estimates are unbiased and they have minimum variance within the class of linear unbiased estimates. The quality of the estimates is however only guaranteed as long as the assumptions underlying the mathematical model hold. Any misspecification in the model may invalidate the results of filtering and thus also any conclusion based on them.

In the improved real-time fully-coupled GPS/IMU positioning process and system with differential GPS, an alternative for a Kalman filter for position and attitude derivation is a robust Kalman filter. This robust Kalman filter is stable enough to operate in more than one dynamical environment. If the dynamics change drastically, or if a sensor failure occurs, for example, a GPS satellite signal failure or an inertial sensor signal failure, the filter must detect, rectify and isolate the failure situation.

A robust filter has the characteristic that it provides near-optimum performance over a large class of process and measurement models. The pure Kalman filter is not robust since it is optimal for only one particular process and measurement model. If the filter is not correct, the filter covariance may report accuracy which is different from what can actually be achieved. The purpose of filter integrity is to ensure that the predicted performance from the error covariance is close to the actual estimation error statistics. In addition, filter divergence is usually caused by a changing process, measurement model, or a sensor failure.

Figure 8:
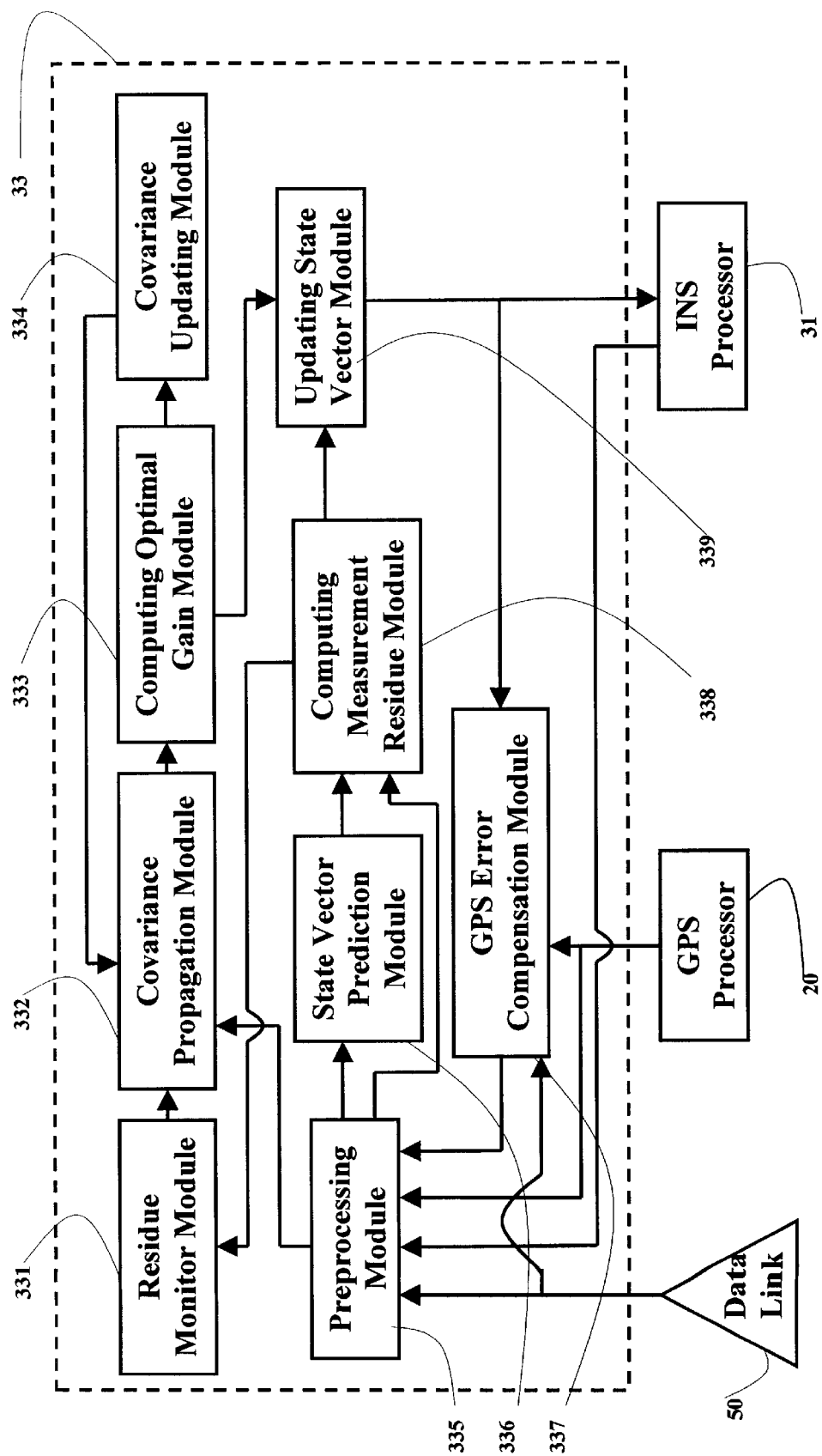
FIG. 8 is a block diagram of the robust Kalman filter implementation according to the above preferred embodiment of the present invention.

This present invention uses a residual monitoring method to obtain a robust Kalman filter which is used to blend the global positioning system raw data and the inertial sensor measurements. When the proper redundancy is available, residual monitoring schemes can efficiently detect hard and soft failures and filter divergence. One benefit of the residual monitoring approach is that when the filter model is correct, the statistical distribution of the residual sequence is known. Thus, it is easy to generate a measurement editing and divergence detection scheme using a test-of-distribution on the measurement residuals. The same statistics can be used to assess the filter tuning and adjust the size of the covariance when divergence is detected. FIG. 8 gives the implementation of this robust Kalman filter including a residual monitoring function.

As shown in FIG. 8, a GPS error compensation module 337 gathers the GPS rover raw measurements (including pseudorange, carrier phase, and Doppler shift) from the GPS processor 20, the GPS reference raw measurements, position, and velocity from the data link 50, and the position and velocity corrections from an updating state vector module 339 to perform GPS error compensation. The corrected GPS raw data are sent to the preprocessing module 335.

A preprocessing module 335 receives the GPS satellite ephemeris from the GPS processor 20, the corrected GPS reference and rover raw data from the GPS error compensation module 337, and INS solutions from the INS processor 31. The preprocessing module 335 performs the calculation of the state transition matrix and sends it as well as the previous state vector to a state vector prediction module 336. The calculated state transit matrix is also sent to a covariance propagation module 332. The preprocessing module 335 calculates the measurement matrix and the current measurement vector according to the computed measurement matrix and the measurement model. The measurement matrix and the computed current measurement vector are passed to a computing measurement residue module 338.

The state vector prediction module 336 receives the state transition matrix and the previous state vector from the preprocessing module 335 to perform state prediction of the current epoch. The predicted current state vector is passed to the computing measurement residue module 338.

The computing measurement residue module 338 receives the predicted current state vector from the state vector prediction module 336 and the measurement matrix and the current measurement vector from the preprocessing module 335. The computing measurement residue module 338 calculates the measurement residues by subtracting the multiplication of the measurement matrix and the predicted current state vector from the current measurement vector. The measurement residues are sent to a residue monitor module 331 as well as the updating state vector module 339.

The residue monitor module 331 performs a discrimination on the measurement residues received from the computing measurement residue module 338. The discrimination law is whether the square of the measurement residues divided by the residual variance is larger than a given threshold. If the square of the measurement residues divided by the residual variance is larger than this given threshold, the current measurement may lead to the divergence of the Kalman filter. When it occurs, the residue monitor module 331 calculates a new covariance of the system process or rejects the current measurement. If the square of the measurement residues divided by the residual variance is less than this given threshold, the current measurement can be used by the Kalman filter without changing the current covariance of system process to obtain the current navigation solution. The covariance of the system process is sent to the covariance propagation module 332.

The covariance propagation module 332 gathers the covariance of the system process from the residue monitor module 331, the state transition matrix from the preprocessing module 335, and the previous covariance of estimated error to calculate the current covariance of the estimated error. The computed current covariance of the estimated error is sent to a computing optimal gain module 333.

The computing optimal gain module 333 receives the current covariance of the estimated error from the covariance computing module 332 to compute the optimal gain. This optimal gain is passed to a covariance updating module 334 as well as the updating state vector module 339. The covariance updating module 334 updates the covariance of the estimated error and sends it to the covariance propagation module 332.

The updating state vector module 339 receives the optimal gain from the computing optimal gain module 333 and the measurement residues from the computing measurement residue module 338. The updating state vector module 339 calculates the current estimate of the state vector including position, velocity and attitude errors and sends them to the GPS error compensation module 337 and the INS processor 31.

In view of the above, the present invention can provide a real-time fully-coupled vehicle positioning process and system with differential GPS to substantially solve the problems encountered in global positioning system-only and inertial navigation system-only, such as loss of global positioning satellite signal, sensitivity to jamming and spoofing, and the inertial solution's drift over time. Therefore, the following features and advantages can thus be achieved:

(1) The velocity and acceleration from an inertial navigation processor are used to aid the code and carrier phase tracking of the global positioning system satellite signals, so as to enhance the performance of the global positioning and inertial integration system, even in heavy jamming and high dynamic environments.

(2) The velocity and acceleration from an inertial navigation processor are corrected by a Kalman filter and used to aid the code and carrier phase tracking of the global positioning system satellite signals, so as to enhance the performance of the global positioning and inertial integration system, even in heavy jamming and high dynamic environments.

(3) To accurately determine the receiver position and velocity at the centimeter level, the GPS phase measurements will be used and the differential GPS will be employed. In this invention, a new process (OTF (on-the-fly) technique) is proposed to resolve the integer ambiguities on the fly and estimate the receiver position in real time. The results of GPS estimates will increase the accuracy of the inertial navigation system and therefore enhance the capability of the GPS tracking loop.

(4) To perform the differential GPS, the data link 50 (as shown in FIG. 2) is used to receive the raw measurements, position, and velocity from a reference site.

(5) The self-contained INS complements the GPS as the GPS receiver suffers the loss of the GPS signals. Once the GPS receiver regains the signals and then estimates the receiver position and velocity, the output (position and velocity) of the GPS receiver is used to correct the position and velocity of the INS that has drifted.

(6) The inertial navigation system aids the satellite signal integer ambiguity resolution of the global positioning system by providing more accurate position information.

(7) The integrated navigation solution of the global positioning system and the inertial measurement unit aids the satellite signal integer ambiguity resolution of the global positioning system by providing more accurate position information.

(8) The satellite signal carrier phase measurements (reference and rover) are used in the Kalman filter, as well as the pseudorange and delta range of the global positioning system, so as to improve the accuracy of the integration positioning solution.

(9) The Kalman filter is implemented in real time to optimally blend the global positioning system raw data and the inertial navigation solution and to estimate the navigation solution.

(10) The robust Kalman filter is implemented in real time to eliminate the possible instability of the integration solution.

(11) Low accuracy inertial sensor is used for achieving a high accuracy integration solution due to the aiding of the global positioning system measurements.

The present invention can be used for Wide Area and Local Area Augmentation Systems where precision corrections are required. The formal requirements established by the FAA for the WAAS (Wide Area Augmentation System) stipulate that aircraft real time position should be determined to an accuracy of 7.6 meters in both the vertical and horizontal component planes with a 95% probability (two sigma). This assumes a conventional single-frequency user applying WAAS-supplied corrections to broadcast GPS orbits and clocks and to the ionopheric delay model.

The wide-area master station (WMS) tracks and processes the GPS data to derive a vector correction for each GPS satellite. The vector correction will include GPS ephemeris errors, satellite clock errors, and ionospheric delay estimates. The FAA distinguishes two kinds of corrections: a slow correction and a fast correction. The slow correction contains the slowly varying errors: the ephemeris error and long-term clock errors. Due to its slowly varying nature, this error need be transmitted no more than every 120 seconds. On the other hand, the satellite clock error is quickly varying due to selective availability (SA). A given satellite should not be unreported for more than six seconds. The Message Type 25 shall provide the WAAS' users the slow varying satellite ephemeris and clock errors with respect to the broadcast values.

The present invention can be applied to autonomous navigation for Reusable Launch Vehicles (RLVs), which is used to transport payloads and humans between the earth and space successfully and safely. The autonomous multi-antenna GPS/DGPS/MEMS IMU/WAAS/Radar Altimeter integrated system provides precise, reliable indispensable navigation information for all of the RLV's flight phases. The real time automatic reconfiguration capability is realized by a flexible Federated Kalman filtering mechanization and an expert mission planing system. The configured GPS/INS integration provides a navigation solution during the RLV's ascent and descent phases. The configured GPS Interferometer/INS integration provides a navigation solution for the RLV's orbital operations, while the configured GPS/DGPS/WAAS/INS/Radar Altimeter integration provides a precise approach and landing capability for the RLV. The GPS, INS, Radar Altimeter, and WAAS sensors assume complementary roles so that optimal system performance is achieved for every flight phase with the characteristics of high precision, high integrity and seamless navigation. An intelligent neural network is applied to perform multi-sensor failure detection and isolation, and redundancy management.

The boost stage is from take-off until the main engine cut-off. Since the launch vehicle may meet large disturbances, such as winds, structure disturbances, and thrust direction errors, launch vehicle attitude stabilization is of critical importance during this stage. Another problem is a potential failure of a GPS-only system due to high launch vehicle dynamics during the boost stage. The Fully-Coupled GPS/INS integrated system using pseudorange and delta range measurements provides robust navigation performance during the boost stage. The velocity and acceleration (V-A) information derived from the INS is injected into the GPS signal tracking loops to improve the dynamic performance and interference tolerance of the GPS receiver.

Within the fully-coupled GPS/INS integration architecture, the MEMS IMU sensor and the GPS receiver complement each other at an advanced level. The advantages of the Fully-Coupled integration mode include: 1) hardware-level redundancy, 2) low-cost IMU sensors, 3) enhanced anti-interference, 4) dramatically extended dynamic range, 5) shortened time-to-first-fix (TTFF) and signal reacquisition time, and 6) excellent navigation accuracy.

A low-cost multi-antenna GPS and MEMS IMU integration with interferometric processing executes navigation with an attitude estimation capability for the RLV's orbital operations. This integration approach eliminates the need for a star tracker for attitude estimation. GPS attitude determination using carrier phase measurements can be made with 3 antennas at the ends of two baselines of known length. Before attitude information can be computed, the initial phase ambiguities must be solved.

A GPS/DGPS/WAAS/MEMS IMU/Radar Altimeter integration mode provides precise approach and landing capability for the RLV. The absolute positioning accuracy achievable from GPS is dependent upon the accuracy of the GPS measurements which are affected by many errors. The major error sources include ephemeris error, clock error including Selective Availability (SA), atmospheric effects and multipath. SA is the intentional degradation of the system imposed by the DoD through satellite clock dithering and is the largest error source using GPS. The GPS is augmented by the WAAS/DGPS data and the altitude measurements coming from a radar altimeter.

During the descent stage, the fully-coupled GPS/MEMS IMU provides the RLV's position and attitude information under the high dynamic environment. Toward the end of the descent stage, the WAAS receiver starts to track the WAAS signal, and the DGPS receiver also starts to receive correction data from the ground-based reference station. In the DGPS/WAAS mode, the RLV navigation system is more reliable than DGPS-only or the WAAS-only system. A key consideration for DGPS/WAAS mode is to select a relevant ground reference station which provides the most applicable error corrections. A tradeoff analysis and decision should be made for the geometry. An approach that weighs the corrections based on the RLV-GPS-ground reference station geometry seems to be appropriate.

Figure 12:
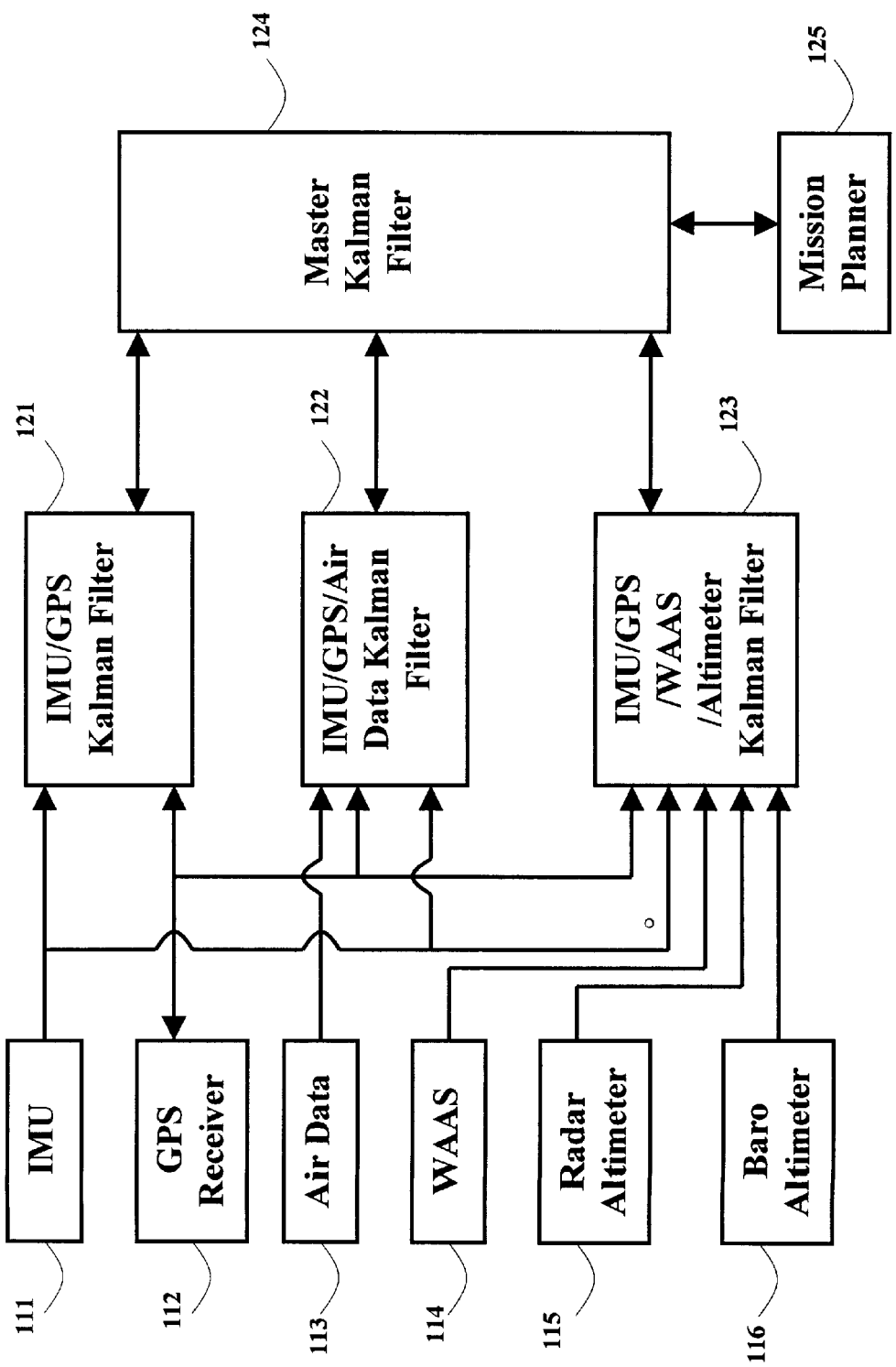
FIG. 12 is a block diagram of the improved navigation application system according to the above preferred embodiment of the present invention.

Another typical application of present invention is in the aircraft industry, as shown in FIG. 12. The navigation sensor array comprises of an IMU 111, a GPS receiver 112, an air data 113, a WAAS 114, a radar altimeter 115, and a baro altimeter 116. The measurements from the sensor array are processed by a plurality of local Kaiman filters, and finally blended in a master Kalman filter 124. The measurement from the IMU 11 and the GPS receiver 112 are processed by an IMU/GPS Kalman filter 121. The measurements from the IMU 111, the GPS receiver 112, and the air data 113 are processed an IMU/GPS/Air Data Kalman filter 122. The measurements from the IMU 111, the GPS receiver 112, the WAAS 114, the radar altimeter 115, and the baro altimeter 116 are processed by an IMU/GPS/WAAS/Altimeter Kalman filter 123.

A mission planner 125 is connected with the master Kalman filter 124. The working mode of the master Kalman filter is monitored and commanded by the mission planner. The navigation solution is sent to the mission planner so that the mission planner can generate commands based on current mission status. The mission planner dynamically configures the master Kalman filter to obtain an optimal navigation solution for all stages of flight by enabling the appropriate local filters and their navigation sensors. The system reconfiguration is done by pre-programmed flight information and by monitoring key system states to detect flight phase transitions. The monitoring is done by resetting its parameters based on the divergence tests, and verifying the subsequent performance of the calibrated system.

Figure 10:
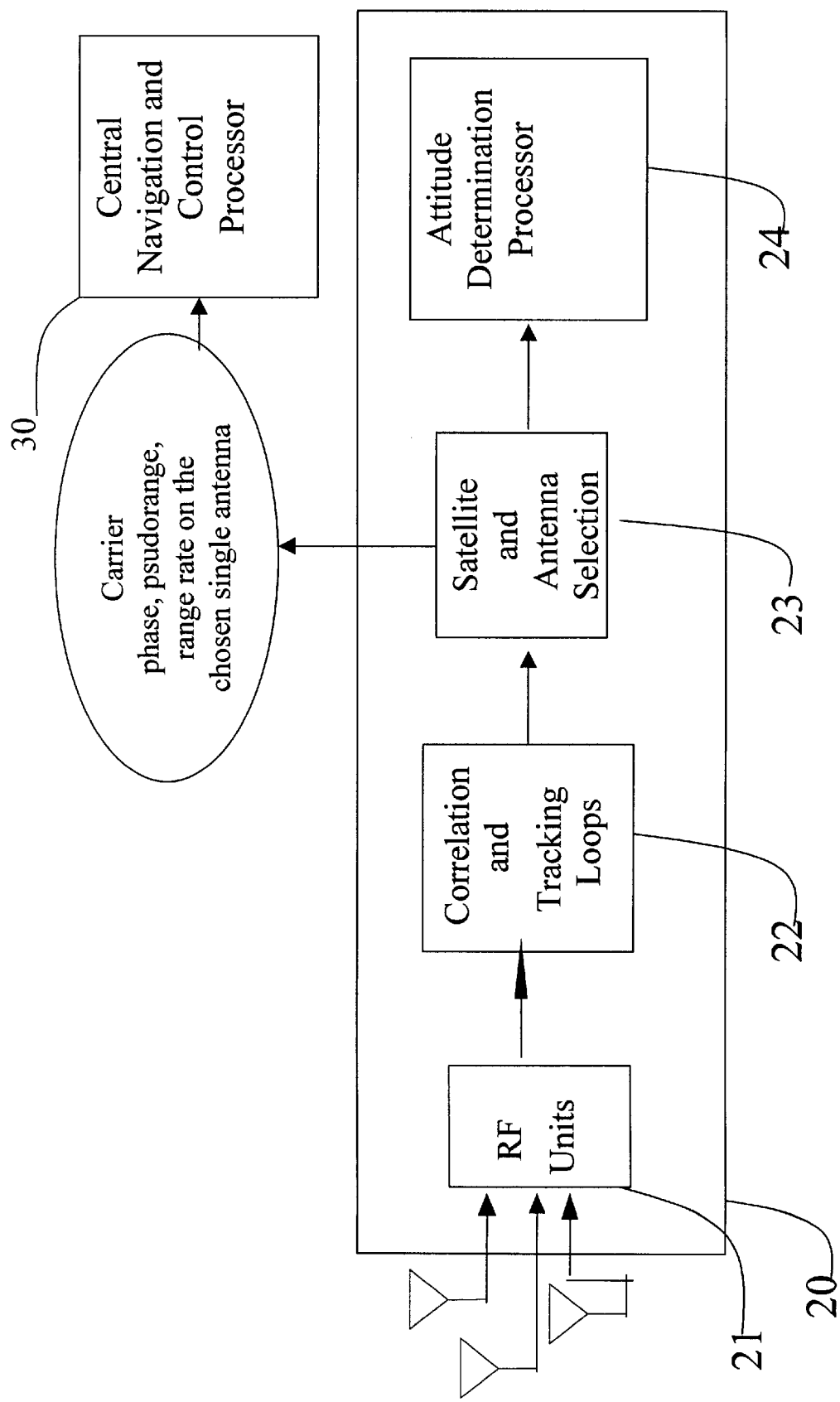
FIG. 10 is a block diagram of the GPS processor according to the above preferred embodiment of the present invention.
Figure 11:
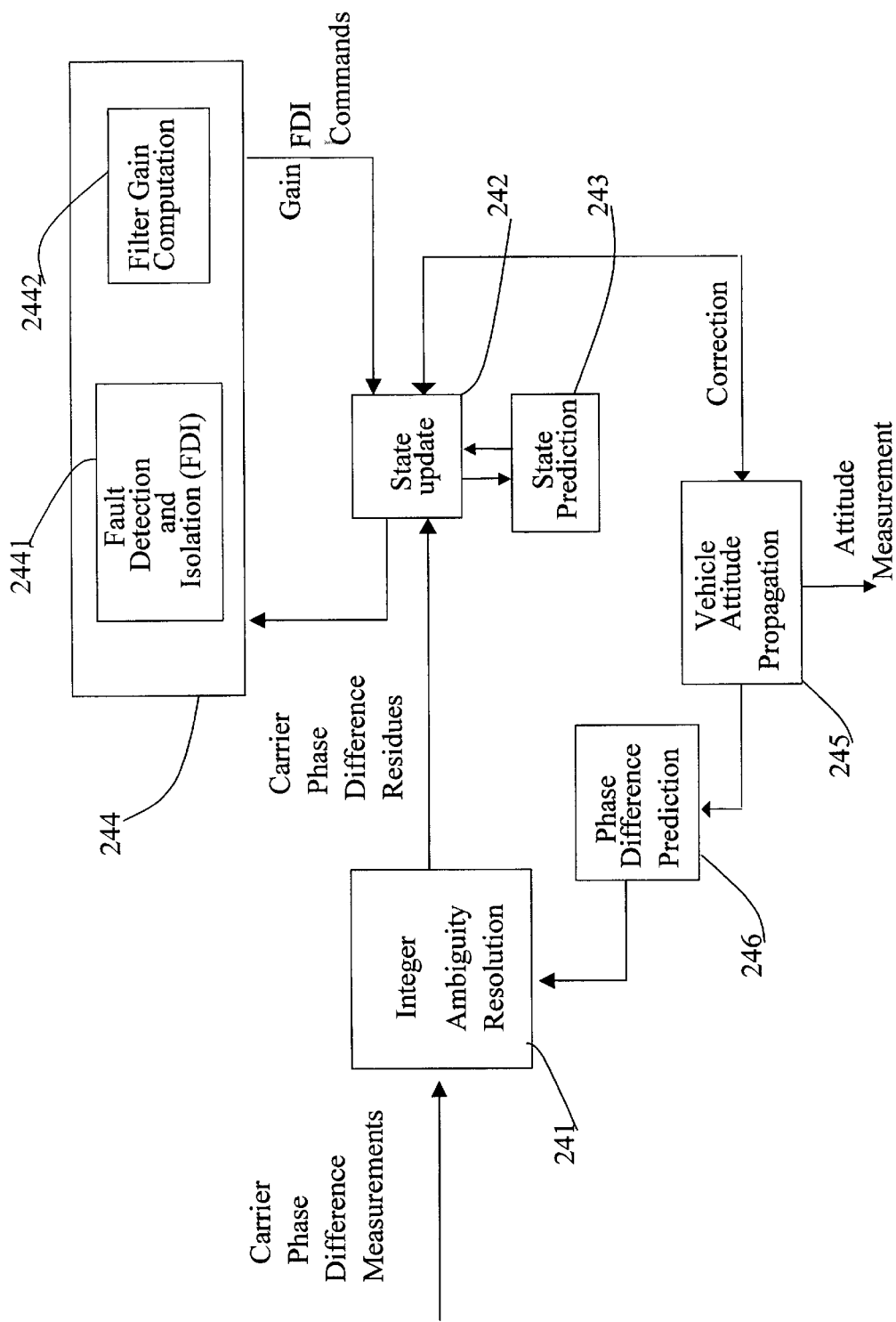
FIG. 11 is a block diagram of the preferred attitude determination according to the above preferred embodiment of the present invention.

The preferred embodiment of the GPS processor 20 is disclosed in FIG. 10 to adapt the multiple GPS antenna to derive a GPS attitude measurements as a backup of the attitude the of the fully-coupled GPS/IMU processing mentioned above. Referring to FIG. 10, the GPS processor 20 further comprises:

(1) a RF unit 21, for converting the RF (radio frequency) GPS signals from the multiple GPS antennas to digital base band GPS signals, which are sent to a correlation and tracking loops 22;

(2) the correlation and tracking loops 22, for receiving the digital base band GPS signals of the multiple GPS antenna to perform the tracking processing of the GPS signals and to derive GPS carrier phase, psuedorange, and range rate measurements on the multiple GPS antenna, which are sent to a satellite and antenna selection module 23;

(3) the satellite and antenna selection module 23, for choosing a GPS antenna with a maximum number of GPS satellites in view and performing the carrier phase difference processing among the multiple GPS antenna to derive the carrier phase difference measurements of the multiple GPS antenna, wherein the GPS carrier phase, psuedorange, and range rate measurements of the chosen GPS antenna with maximum number of GPS satellites in view are sent to the central navigation and control processor 30 to perform the fully-coupled GPS/IMU processing, and the carrier phase difference measurements of the multiple GPS antenna are sent to the attitude determination processor 24;

(4) the attitude determination processor 24, for receiving the carrier phase difference measurements of the multiple GPS antenna to derive the GPS attitude measurement. Referring to FIG. 11, the attitude determination processor 24 further comprises:

(1) an integer ambiguity resolution module 241, for receiving the carrier phase difference measurements of the multiple GPS antenna to fix the ambiguity integer number of the carrier phase difference measurements and receiving the predicted carrier phase difference measurements of the multiple GPS antenna from a phase difference prediction module 246 to form a carrier phase difference residues;

(2) a state update module 242, for establishing a vector equations of the GPS attitude measurement errors, whose elements are called state variables, and receiving predicted state estimates from a state prediction module 243, gain parameters and FDI command from the fuzzy logic inference module 244, and the carrier phase difference residues from the integer ambiguity resolution module 241 to derive current estimate of the GPS attitude measurement errors;

(3) a state prediction module 243, for receiving current estimate of the GPS attitude measurement errors to predict estimate of the GPS attitude measurement errors at next epoch;

(4) the fuzzy logic inference module 244, for receiving the carrier phase difference residues to determine if the carrier phase difference residues has big error and determine a optimal gain parameter for the state update module 242

(5) a vehicle attitude propagation module 245, for propagating the previous epoch GPS attitude measurements to current epoch GPS attitude measurements and receiving current estimate of the GPS attitude measurement errors to correct current epoch GPS attitude measurements, and outputting the corrected current epoch GPS attitude measurements as optimal GPS attitude measurements;

(6) the phase difference prediction module 246, for receiving optimal GPS attitude measurements at current epoch to generate the predicted carrier phase difference measurements of the multiple GPS antenna at next epoch.

Referring to FIG. 11, the fuzzy logic inference module 244 further comprises:

(1) a fault detection and isolation (FDI) module 2441, for receiving the carrier phase difference residues to determine if the carrier phase difference residues has big error, and output a reject FDI commands if the carrier phase difference residues has big error;

(2) a filter gain computation 2442, for receiving the carrier phase difference residues to determine a optimal gain parameter for the state update module 242

The acceleration and velocity data from the central navigation and control processor 30 can be input to the correlation and tracking loops 22 to aid the tracking processing of the GPS signals.

The attitude data from the central navigation and control processor 30 can be input to vehicle attitude propagation module 245 as the initial GPS attitude measurement.

What is claimed is:

1. An improved fully-coupled vehicle positioning system, comprising:

a global positioning system (GPS) processor for providing GPS measurements including pseudorange, carrier phase, and Doppler shift, for a slave system;

a data link for receiving GPS-like signal from a master system, where said GPS-like signal is a frequency shift GPS signal and generated by said master system;

an inertial measurement unit (IMU) for providing inertial measurements including body angular rates and specific forces;

a central navigation processor, which are connected with said GPS processor, said IMI and said data link, comprising an inertial navigation system (INS) processor, a Kalman filter, a new satellites/cycle slips detection module, and an on-the-fly ambiguity resolution module; and an input/output (I/O) interface connected to said central navigation processor;

a GPS antenna of said master system for receiving GPS signal;

a frequency mixer of said master system for shifting carrier frequency of said GPS signal received from said GPS antenna to generate said GPS-like signal;

a data link of said master system for transmitting said GPS-like signal;

wherein said GPS measurements from said GPS processor and GPS-like signal from said data link are passed to said central navigation processor and said inertial measurements are injected into said inertial navigation system (INS) processor;

wherein said GPS-like signal is processed by said central navigation processor to derive GPS measurements;

wherein an output of said INS processor and said GPS measurements are blended in said Kalman filter; an output of said Kalman filter is fed back to said INS processor to correct an INS navigation solution, which is then output from said central navigation processor to said I/O interface;

wherein said INS processor provides velocity and acceleration data injected into said GPS processor to aid code and carrier phase tracking of GPS satellite signals;

wherein an output of said GPS processor, an output of said data link, and an output of said INS processor are injected into a new satellites/cycle slips detection module to test the occurrence of new satellites and cycle slips, wherein as said new satellites/cycle slips detection module is on, said on-the-fly ambiguity resolution module is activated to resolve global positioning system satellite signal carrier phase integer ambiguities;

wherein said on-the-fly ambiguity resolution module outputs the integer ambiguities into said Kalman filter to further improve positioning accuracy, and said INS processor outputs navigation data to said I/O interface.

2. An improved fully-coupled vehicle positioning system, as recited in claim 1, wherein said GPS processor further comprises:

a RF (radio frequency) unit for converting the RF GPS signals from a plurality of GPS antennas to a plurality of digital base band GPS signals;

a correlation and tracking loops for receiving said digital base band GPS signals of said GPS antenna to perform the tracking processing of the GPS signals and to derive GPS carrier phase, psuedorange, and range rate measurements;

a satellite and antenna selection module for choosing a GPS antenna with a maximum number of GPS satellites in view and performing the carrier phase difference processing among said GPS antenna to derive the carrier phase difference measurements of said GPS antenna, wherein said GPS carrier phase, psuedorange, and range rate measurements of the chosen GPS antenna with maximum number of GPS satellites in view are sent to said central navigation processor to perform the fully-coupled GPS/IMU processing;

an attitude determination processor for receiving the carrier phase difference measurements of said GPS antenna to derive the GPS attitude measurement.

3. An improved fully-coupled vehicle positioning method comprises steps of:

(a) receiving global positioning system raw measurements, including pseudorange, carrier phase, and Doppler shift;

(b) receiving a GPS-like signal from a data link;

(c) sending said GPS raw measurements to a central navigation processor from a GPS processor and said data link;

(d) receiving a plurality of inertial measurements including body angular rates and specific forces from an inertial measurement unit (IMU);

(e) computing an inertial navigation solution which are position, velocity, acceleration, and attitude of a vehicle by sending said inertial measurements from said IMU to an inertial navigation system (INS) processor of said central navigation processor for (f) fixing integer ambiguities based on testing the occurrence of new satellites or cycle slips using said GPS rover raw measurements from said GPS processor, GPS reference raw measurements, position, and velocity from said data link, and said inertial navigation solution from said INS processor and send the integer ambiguities to a Kalman filter;

(g) blending an inertial navigation solution derived from said INS processor and said GPS raw measurements from said GPS processor and said data link in said Kalman filter to derive INS corrections and GPS corrections;

(h) feeding back said INS corrections from said Kalman filter to said INS processor to correct said inertial navigation solution; and (i) sending said inertial navigation solution from said INS processor to an I/O interface, so as to provide navigation data for an on-board avionics system.

* * * * *

UNITED STATES PATENT AND TRADEMARK OFFICE
CERTIFICATE OF CORRECTION

PATENT NO. : 6,424,914 B1
DATED : July 23, 2002
INVENTOR(S) : Ching-Fang Lin

It is certified that error appears in the above-identified patent and that said Letters Patent is hereby corrected as shown below:

<u>Column 4,</u>
Line 28, after "position in real time", insert -- , wherein the on-the-fly ambiguity resolution is one of the most recent additions to the GPS toolbox to determine the correct number of initial integer cycles in carrier-phase measurements, while a receiver is in motion, as indicated in another patent application of the applicant, application number 09/611,568. --

Signed and Sealed this

Nineteenth Day of November, 2002

Attest:

Attesting Officer

JAMES E. ROGAN
*Director of the United States Patent and Trademark Office*